(12) United States Patent
Nakajima

(10) Patent No.: US 9,797,717 B2
(45) Date of Patent: Oct. 24, 2017

(54) MEASURING APPARATUS AND METHOD OF MANUFACTURING ARTICLE

(71) Applicant: CANON KABUSHIKI KAISHA, Tokyo (JP)

(72) Inventor: Masaki Nakajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 14/643,170

(22) Filed: Mar. 10, 2015

(65) Prior Publication Data
US 2015/0260510 A1  Sep. 17, 2015

(30) Foreign Application Priority Data

Mar. 13, 2014 (JP) .................................. 2014-050532

(51) Int. Cl.
*G01B 11/25* (2006.01)
*G02B 27/42* (2006.01)
(Continued)

(52) U.S. Cl.
CPC ...... *G01B 11/2513* (2013.01); *G01B 11/2527* (2013.01); *G02B 5/3083* (2013.01); *G02B 26/0808* (2013.01); *G02B 27/0944* (2013.01); *G02B 27/28* (2013.01); *G02B 27/4205* (2013.01); *G02F 1/1313* (2013.01)

(58) Field of Classification Search
None
See application file for complete search history.

(56) References Cited

U.S. PATENT DOCUMENTS 5,307,153 A   4/1994  Maruyama et al.
7,492,450 B2  2/2009  Harding et al.
(Continued)

FOREIGN PATENT DOCUMENTS

EP   0462595 A2   12/1991
EP   1084430 A2   3/2001
(Continued)

OTHER PUBLICATIONS

Extended European Search Report issued in EP15000519.7, dated Nov. 23, 2015.
Partial European Search Report issued in EP15000519.7, dated Jul. 23, 2015.

*Primary Examiner* — Eileen Adams
(74) *Attorney, Agent, or Firm* — Rossi, Kimms & McDowell LLP

(57) ABSTRACT

The present invention provides a measuring apparatus for measuring a shape of an object to be measured, comprising an emitting unit configured to emit pattern light, an optical system configured to guide the pattern light emitted from the emitting unit to the object, a deflection unit arranged between the optical system and the object and configured to deflect the pattern light emitted from the optical system, an image sensing unit configured to capture the object via the optical system and the deflection unit, and a processing unit configured to determine the shape of the object based on an image of the object captured by the image sensing unit, wherein the deflection unit comprises a diffraction grating configured to diffract the pattern light emitted from the optical system.

18 Claims, 13 Drawing Sheets

(51) Int. Cl.
*G02B 26/08* (2006.01)
*G02B 27/28* (2006.01)
*G02B 5/30* (2006.01)
*G02F 1/13* (2006.01)
*G02B 27/09* (2006.01)

(56) References Cited

U.S. PATENT DOCUMENTS

| | | | |
|---|---|---|---|
| 7,599,071 B2 | 10/2009 | Dillon et al. | |
| 2010/0142014 A1* | 6/2010 | Rosen | G03B 35/02 359/1 |
| 2011/0262007 A1* | 10/2011 | Kojima | G01B 11/2509 382/103 |
| 2014/0021350 A1* | 1/2014 | Nishihama | H01J 37/26 250/310 |
| 2015/0131096 A1 | 5/2015 | Hatada et al. | |
| 2015/0168210 A1* | 6/2015 | Dorschner | G01J 1/0429 349/18 |

FOREIGN PATENT DOCUMENTS

| | | |
|---|---|---|
| EP | 1777490 A2 | 4/2007 |
| EP | 2873946 A1 | 5/2015 |
| JP | 2013178174 A | 9/2013 |
| JP | 2015094756 A | 5/2015 |
| WO | 2006107929 A1 | 10/2006 |

\* cited by examiner

ILLUMINATION LIGHT PATH       TEST LIGHT PATH

ILLUMINATION LIGHT PATH       TEST LIGHT PATH

F I G. 8
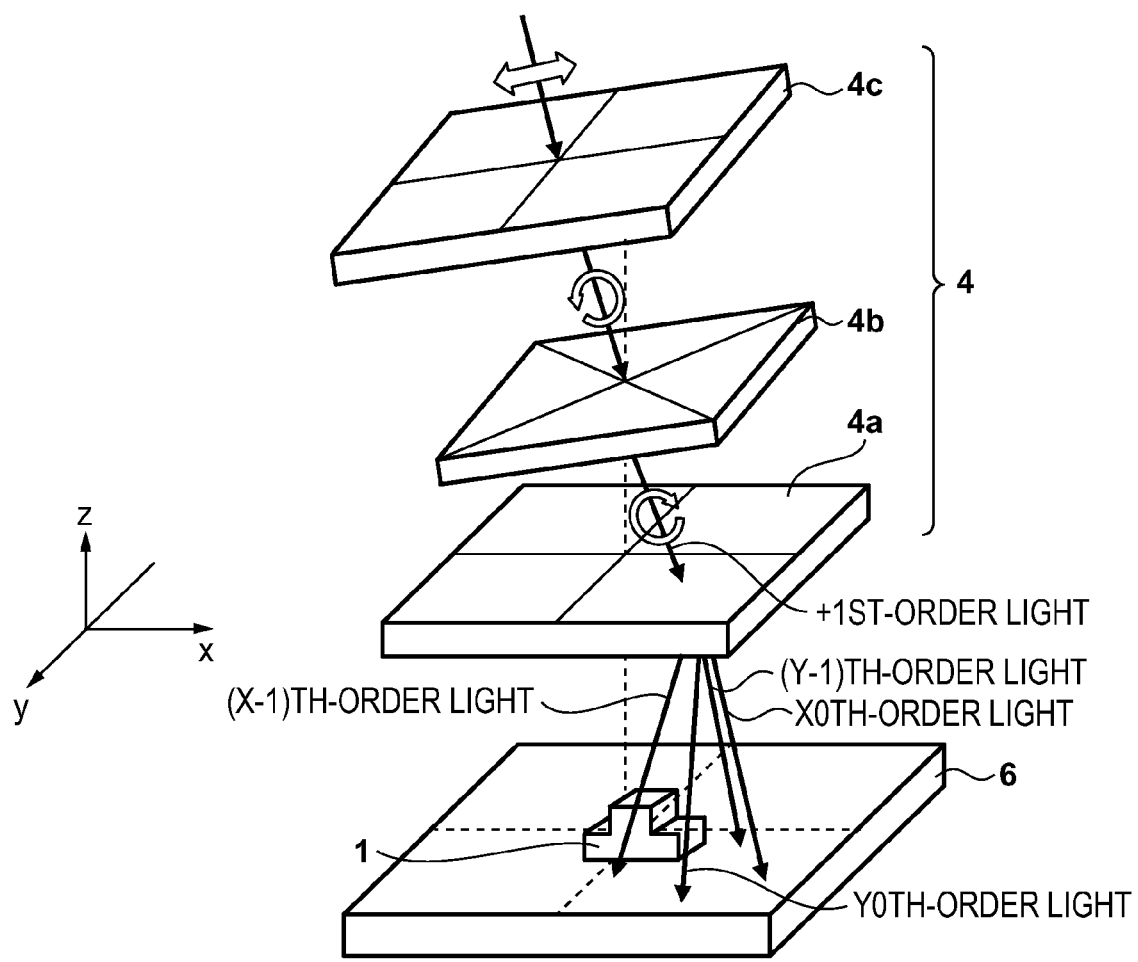

F I G. 13
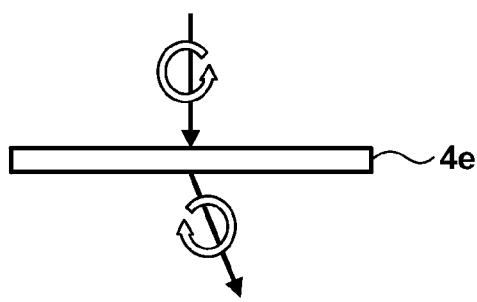
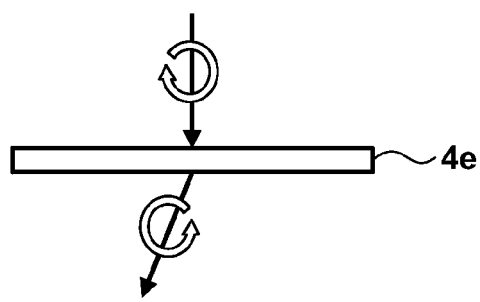
LEFT-HANDED CIRCULARLY
POLARIZED LIGHT
RIGHT-HANDED CIRCULARLY
POLARIZED LIGHT

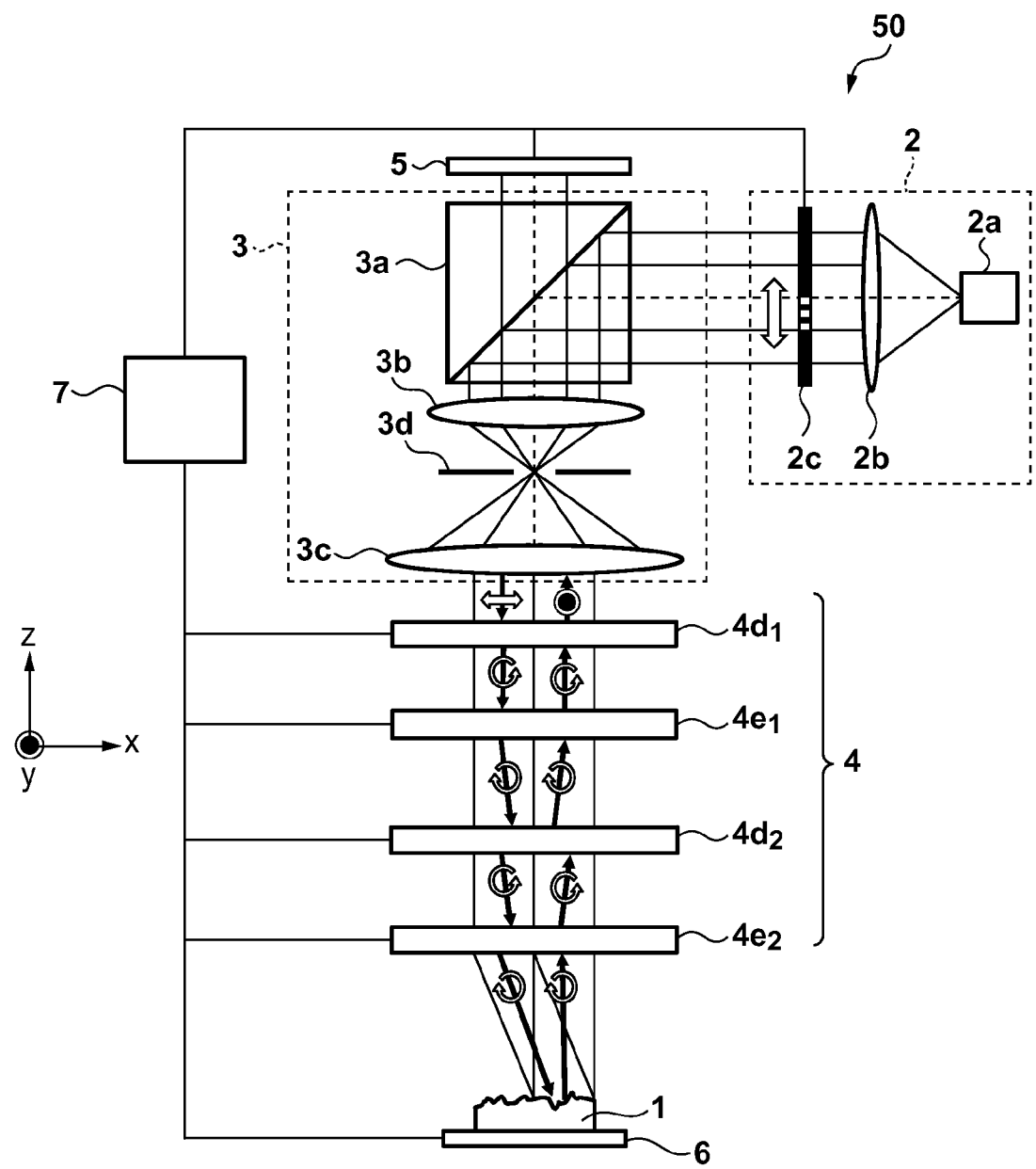
F I G. 14

MEASURING APPARATUS AND METHOD OF MANUFACTURING ARTICLE

BACKGROUND OF THE INVENTION

Field of the Invention

The present invention relates to a measuring apparatus for measuring the shape of an object to be measured, and a method of manufacturing an article.

Description of the Related Art

As a method for measuring the shape of an object using light in a noncontact manner, a pattern projection method (pattern projection triangulation) is known. In the pattern projection method, an object to which a known two-dimensional pattern is projected is captured, and the deformation amount of the two-dimensional pattern generated in accordance with the shape of the object is detected, thereby obtaining the shape of the object.

Japanese Patent Laid-Open No. 2013-178174 proposes a measuring apparatus that measures the shape of an object using the pattern projection method. As described in Japanese Patent Laid-Open No. 2013-178174, in general, the measuring apparatus using the pattern projection method individually includes a projection optical system configured to project pattern light on an object, and an image sensing optical system configured to capture the object irradiated with the pattern light.

To reduce the size of the measuring apparatus using the pattern projection method, the projection optical system and the image sensing optical system may be shared at least partially. To accurately measure the shape of an object using the pattern projection method, an angle (convergence angle) may be provided between the direction in which a pattern is projected to the object and the direction in which the object is captured.

SUMMARY OF THE INVENTION

The present invention provides, for example, a technique advantageous in implementing apparatus size reduction and accurate measurement in a measuring apparatus for measuring the shape of an object to be measured using a pattern projection method.

According to one aspect of the present invention, there is provided a measuring apparatus for measuring a shape of an object to be measured, comprising: an emitting unit configured to emit pattern light; an optical system configured to guide the pattern light emitted from the emitting unit to the object; a deflection unit arranged between the optical system and the object and configured to deflect the pattern light emitted from the optical system; an image sensing unit configured to capture the object via the optical system and the deflection unit; and a processing unit configured to determine the shape of the object based on an image of the object captured by the image sensing unit, wherein the deflection unit comprises a diffraction grating configured to diffract the pattern light emitted from the optical system.

Further features of the present invention will become apparent from the following description of exemplary embodiments with reference to the attached drawings.

BRIEF DESCRIPTION OF THE DRAWINGS

FIG. 8 is a schematic view showing the arrangement of the constituent elements of a deflection unit;

FIG. 13 is a view showing the arrangement of a deflection element; and

FIG. 14 is a view showing a modification of the measuring apparatus according to the fifth embodiment.

DESCRIPTION OF THE EMBODIMENTS

Figure 1:
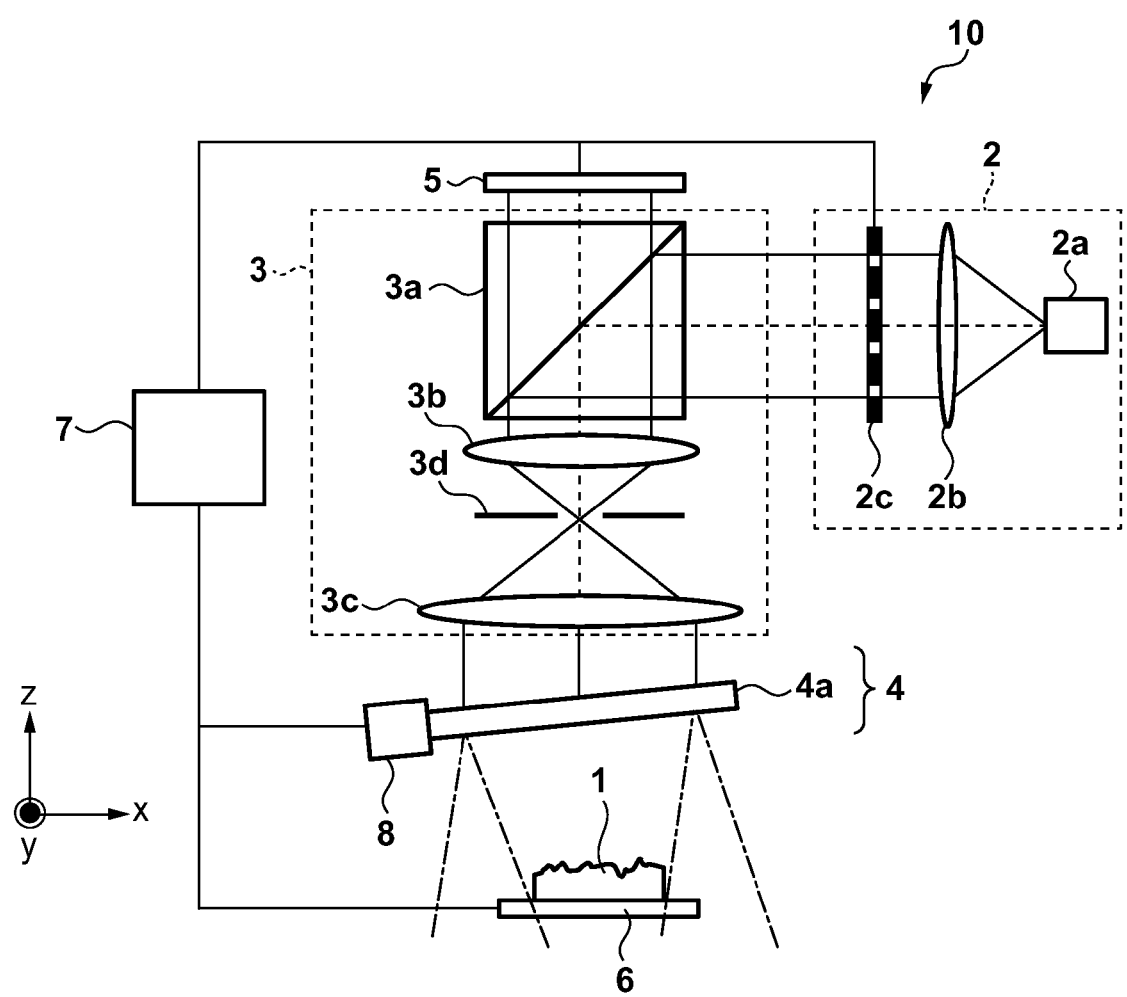
FIG. 1 is a schematic view showing a measuring apparatus according to the first embodiment.

Exemplary embodiments of the present invention will be described below with reference to the accompanying drawings. Note that the same reference numerals denote the same members throughout the drawings, and a repetitive description thereof will not be given.

<First Embodiment>

A measuring apparatus 10 according to the first embodiment of the present invention will be described with reference to FIG. 1. The measuring apparatus 10 according to the first embodiment measures the shape of an object 1 to be measured using a pattern projection method. The pattern projection method (pattern projection triangulation) is a method of capturing the object 1 to which a pattern having a periodical arrangement of bright and dark portions is projected and detecting the deformation amount of the pattern generated in accordance with the shape of the object 1, thereby obtaining the shape of the object 1. The pattern projection method uses several methods of measuring the shape of the object 1, for example, a phase shift method and a space encoding method. In particular, the phase shift method has high measurement accuracy. The phase shift method is a method of capturing the object 1 to which a sinusoidal pattern is projected while shifting the phase of the sinusoidal pattern by every predetermined angle and obtaining the shape of the object 1 based on a change in the received light intensity in each pixel of the captured image. In the first embodiment, a method of measuring the shape of the object 1 using the phase shift method will be described.

The measuring apparatus 10 according to the first embodiment can include an optical system 3 in which a projection optical system and an image sensing optical system are shared at least partially, and a deflection unit 4 that deflects pattern light emitted from the optical system 3 to generate a convergence angle. This makes it possible to widen the measurement range and the visual field of the measuring apparatus 10 and simultaneously reduce the size of the measuring apparatus 10 and also accurately measure the shape of the object 1 with a convergence angle. The arrangement of the measuring apparatus 10 according to the first embodiment will be described below.

FIG. 1 is a schematic view showing the measuring apparatus 10 according to the first embodiment. The measuring apparatus 10 according to the first embodiment can include an emitting unit 2, the optical system 3, the deflection unit 4, an image sensing unit 5, a stage 6, and a processing unit 7. The stage 6 is configured to mount the object 1 and be movable. The processing unit 7 is formed from, for example, a computer including a CPU, a memory, and the like, and determines the shape of the object 1 based on the image of the object 1 captured by the image sensing unit 5. The measuring apparatus 10 according to the first embodiment is configured to cause the processing unit 7 to control measurement of the object 1 (control each unit of the measuring apparatus 10). However, the measuring apparatus 10 may be configured to include a control unit to control measurement of the object 1 independently of the processing unit 7.

The emitting unit 2 can include, for example, a light source 2a, a collimator lens 2b, and a conversion element 2c. Light emitted from the light source 2a is collimated by the collimator lens 2b and is then incident on the conversion element 2c so as to be converted into pattern light spatially having a periodical arrangement of bright and dark portions. The conversion element 2c may include, for example, a mask with a pattern on which optically transparent portions and light-shielding portions are periodically (alternately) arranged, and may include a liquid crystal element or a digital mirror device (DMD). The conversion element 2c configured to include a liquid crystal element or a DMD can convert the light emitted from the light source 2a into light (pattern light) having an arbitrary pattern, for example, a monochrome pattern or a sinusoidal pattern and quickly perform spatial modulation.

The optical system 3 includes, for example, a polarizing beam splitter 3a, objective lenses 3b and 3c used to increase the diameter of pattern light, and an aperture stop 3d arranged at the focal position between the objective lenses 3b and 3c, and guides the pattern light emitted from the emitting unit 2 to the object 1. The pattern light emitted from the emitting unit 2 is reflected by the polarizing beam splitter 3a and passed through the objective lenses 3b and 3c so as to be emitted from the optical system 3 with a larger diameter. The pattern light emitted from the optical system 3 irradiates the object 1 via the deflection unit 4. The pattern light reflected and diffused by the object 1 is incident on the optical system 3 via the deflection unit 4. After the spatial frequency is limited by the aperture stop 3d, the pattern light is transmitted through the polarizing beam splitter 3a and is incident on the image sensing unit 5. The image sensing unit 5 includes, for example, a CCD sensor or a CMOS sensor, and captures the object 1 irradiated with the pattern light via the optical system 3. The processing unit 7 determines the shape of the object 1 based on the image of the object 1 captured by the image sensing unit 5.

In the measuring apparatus 10 according to the first embodiment using the phase shift method, the processing unit 7 determines the shape of the object 1 by obtaining the heights of portions on the surface (to be referred to as a surface to be measured hereinafter) of the object 1 based on the phase differences from a reference surface. At this time, if a step difference larger than the pitch of the pattern of the pattern light is included in the surface to be measured, a measurement error of an integral multiple of the pattern pitch may occur at the portion including the step difference, resulting in difficulty in accurately measuring the shape of the object 1. To prevent such a measurement error, it is effective to measure the shape of the object 1 by irradiating the object 1 with a plurality of pattern light beams having phases different from each other and obtaining the heights of the portions on the surface based on the phase differences in each of the plurality of pattern light beams.

Figure 2:
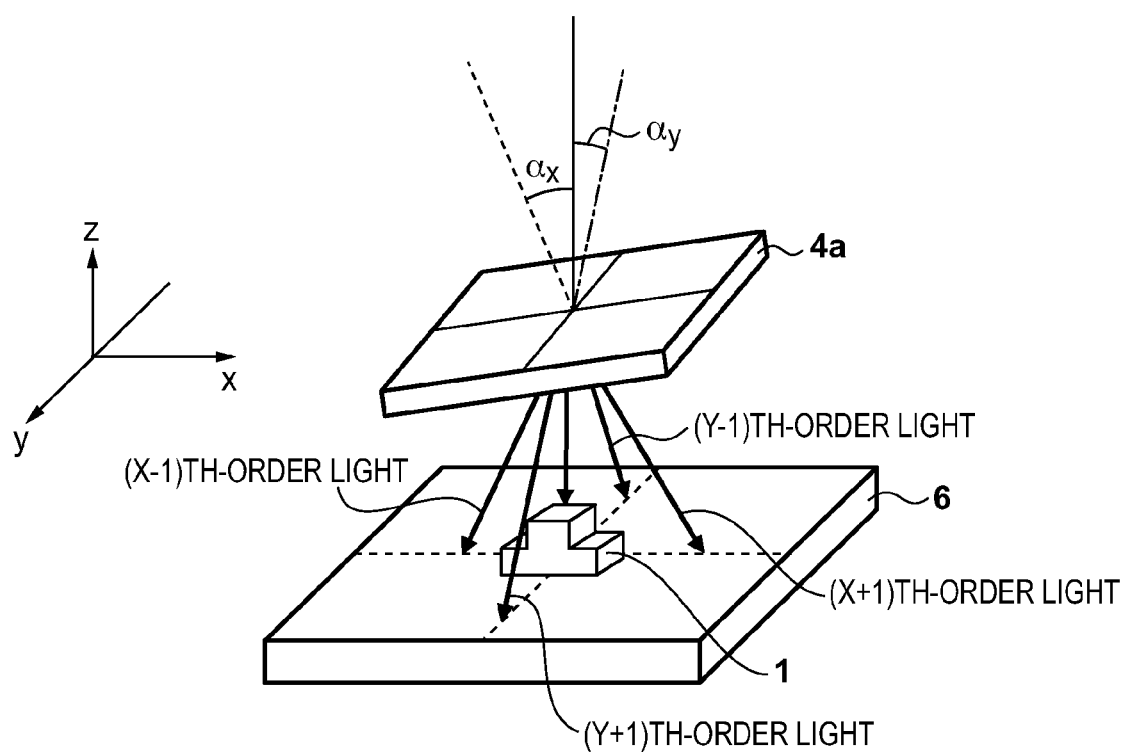
FIG. 2 is a view showing diffracted light of a plurality of orders generated by a diffraction grating.

The measuring apparatus 10 according to the first embodiment includes the deflection unit 4 that includes a diffraction grating 4a for diffracting the pattern light emitted from the optical system 3, and irradiates the object 1 with diffracted light of a plurality of orders generated by the diffraction grating 4a. The diffracted light beams of the plurality of orders generated by the diffraction grating 4a propagate in directions different from each other and irradiate the object 1 on the stage with angles (convergence angles), as shown in FIG. 2. At this time, since the diffracted light beams simultaneously irradiate the object 1, patterns included in the diffracted light beams are projected onto the object in a superimposed manner. The diffraction grating 4a may be arranged to be tilted with respect to the optical axis of the optical system 3 such that the pattern light is obliquely incident on the diffraction grating 4a. This is because the plurality of diffracted light beams generated by the diffraction grating 4a can irradiate the object 1 with convergence angles different from each other. In the first embodiment, a case will be explained, where a two-dimensional diffraction grating in which a conspicuous change in the diffraction efficiency caused by polarization is little, that is, the diffraction direction is not changed by the polarization state of incident light is used as the diffraction grating 4a. However, the present invention is not limited to this. For example, a one-dimensional diffraction grating may be used as the diffraction grating 4a.

In the measuring apparatus 10 having the above-described arrangement when determining the shape of the object 1 based on the image of the object 1 captured by the image sensing unit 5, the phase of each of the plurality of diffracted light beams incident on the image sensing unit 5 needs to be obtained. To do this, the measuring apparatus 10 according to the first embodiment includes a change unit that changes the distance between the object 1 and the diffraction grating 4a (relative positions of the object 1 and the diffraction grating 4a). The processing unit 7 of the measuring apparatus 10 repeats a step of causing the change unit to change the distance between the object 1 and the diffraction grating 4a so as to shift the phase of each diffracted light beam incident on the image sensing unit 5 and causing the image sensing unit 5 to capture the object 1, thereby obtaining a plurality of images of the object 1. Each image obtained by the image sensing unit 5 at this time represents the intensity distribution of light of the plurality of superimposed diffracted light beams. The processing unit 7 performs discrete Fourier transform (to be referred to as DFT hereinafter) for the plurality of images each representing the light intensity distribution, thereby obtaining the phase distribution of each diffracted light beam on the imaging plane of the image sensing unit 5 and determining the shape of the object 1. In the first embodiment, for example, an actuator 8 that drives the diffraction grating 4a in a direction (Z direction) parallel to the optical axis of the optical system 3 is used as the change unit, and the diffraction grating 4a is driven in the Z direction, thereby changing the distance between the object 1 and the diffraction grating 4a. However, the present invention is not limited to this. For example, the stage 6 movable in the Z direction may be used as the change unit, and the object 1 may be driven in the Z direction by the stage 6, thereby changing the distance between the object 1 and the diffraction grating 4a. The distance may be changed relatively by both the actuator 8 and the stage 6.

Figure 3:
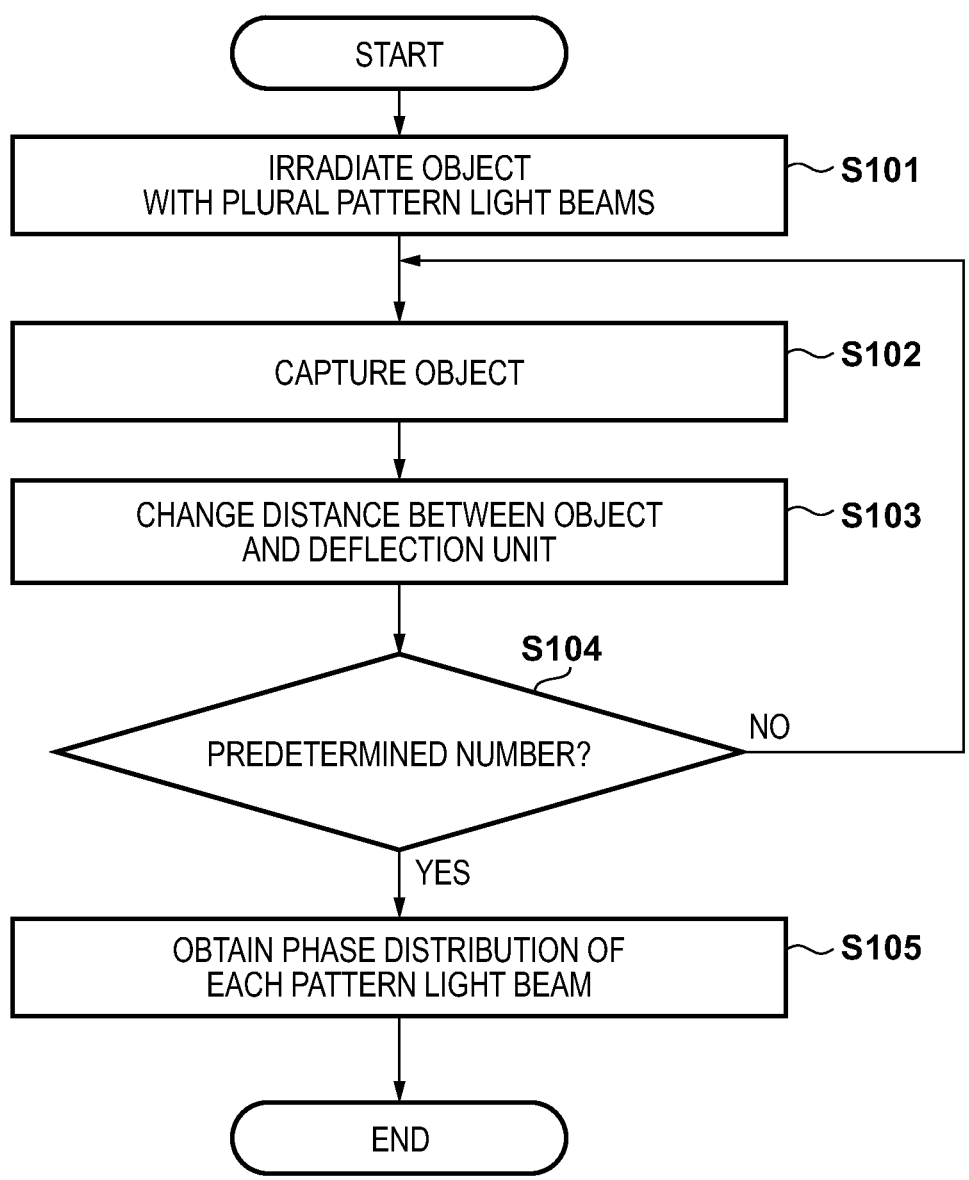
FIG. 3 is a flowchart showing a method of obtaining the phase distribution of each diffracted light beam on the imaging plane of an image sensing unit.

A method of obtaining the phase distribution of each diffracted light beam on the imaging plane of the image sensing unit 5 will be explained below with reference to FIG. 3. FIG. 3 is a flowchart showing the method of obtaining the phase distribution of each diffracted light beam on the imaging plane of the image sensing unit 5. In step S101, the processing unit 7 irradiates the object 1 with a plurality of diffracted light beams (pattern light beams) generated by the diffraction grating 4a arranged to be tilted by an angle $\alpha_x$ in the X direction and an angle $\alpha_y$ in the Y direction with respect to the optical axis of the optical system 3, as shown in FIG. 2. In the first embodiment, a pattern on the grating in which sinusoidal patterns are superimposed while being crossed can be used as the pattern light. When the diffraction grating 4a is arranged to be tilted with respect to the optical axis of the optical system 3, the plurality of diffracted light beams generated by the diffraction grating 4a can irradiate the object 1 with convergence angles different from each other. In step S102, the processing unit 7 causes the image sensing unit 5 to capture the object 1 irradiated with the plurality of diffracted light beams. In step S103, the processing unit 7 causes the change unit (actuator 8) to change the distance between the object 1 and the deflection unit 4 (diffraction grating 4a). This can shift the phases of the diffracted light beams incident on the image sensing unit 5 by phase shift amounts different from each other. In step S104, the processing unit 7 determines whether the number of images captured by the image sensing unit 5 has reached the number (to be referred to as a predetermined number hereinafter) of images with which the phases of the diffracted light beams can be obtained. If the number of images captured by the image sensing unit 5 has not reached the predetermined number, the process returns to step S102 to cause the image sensing unit 5 to capture the object 1 in the state in which the distance between the object 1 and the diffraction grating 4a has been changed by the change unit in step S103. On the other hand, if the number of images captured by the image sensing unit 5 has reached the predetermined number, the process advances to step S105. In step S105, the processing unit 7 obtains the phase distribution of each diffracted light beam on the imaging plane of the image sensing unit 5 based on the plurality of images captured by the image sensing unit 5.

Figure 4:
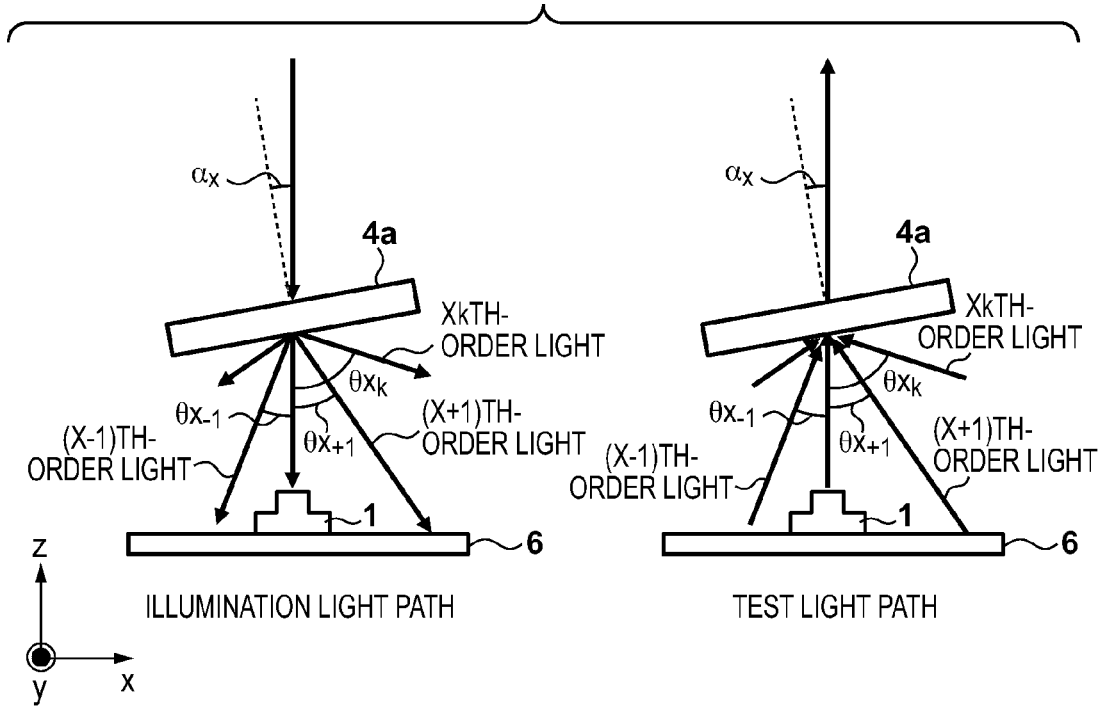
FIG. 4 is a view showing the diffracted light of each order in the X direction.
Figure 5:
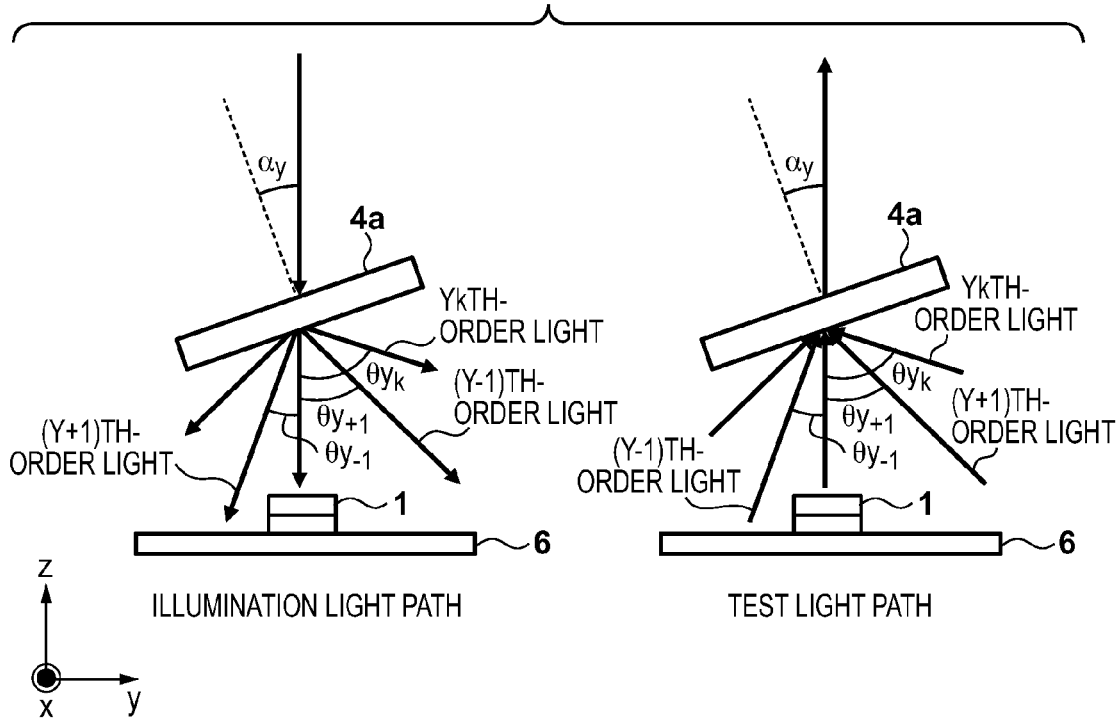
FIG. 5 is a view showing the diffracted light of each order in the Y direction.

Processing of causing the processing unit 7 to obtain the phase distribution of each diffracted light beam in accordance with the flowchart of FIG. 3 will be described next in detail. The object 1 is irradiated with the plurality of diffracted light beams generated by the diffraction grating 4a in a superimposed manner. At this time, there exist illumination light paths of diffracted light beams (the light paths of light beams that irradiate the object 1) and test light paths (the light paths of light beams reflected by the object 1) as many as the number of diffracted light beams, as shown in FIGS. 4 and 5. FIG. 4 shows the diffracted light of each order in the X direction, and FIG. 5 shows the diffracted light of each order in the Y direction. The left view of each of FIGS. 4 and 5 shows the illumination light paths, and the right view shows the test light paths. Hence, letting k be an integer representing the diffraction order (k=0, ±1, ±2, . . . , ±K), a total of $2 \cdot (2 \cdot K+1)^2$ diffracted light beams including the plurality of diffracted light beams in the X direction and the plurality of diffracted light beams in the Y direction irradiate the object 1 in the superimposed manner.

At this time, an intensity I(x, y) of light detected in each pixel of the image sensing unit 5 is given by $$I(x, y) = \qquad (1)$$
$$2 \cdot (2 \cdot K + 1)^2 \cdot A + \sum_{a=-K}^{K} \sum_{b=-K}^{K} B\cos\left(\frac{2\pi}{T_x} Fx_b^a Z(x, y) + \phi x_b^a(x, y)\right) +$$
$$\sum_{a=-K}^{K} \sum_{b=-K}^{K} B\cos\left(\frac{2\pi}{T_y} Fy_b^a Z(x, y) + \phi y_b^a(x, y)\right)$$

where A is the bias component of the pattern light that irradiates the object 1, B is the intensity modulation component of the pattern light, $T_x$ is the X-direction period of the pattern in the pattern light, and $T_y$ is the Y-direction period of the pattern in the pattern light. Fx is a phase change amount generated in each diffracted light beam when diffracted in the X direction, and Fy is a phase change amount generated in each diffracted light beam when diffracted in the Y direction. φx(x, y) and φy(x, y) are the phases (to be referred to as initial phases hereinafter) of the diffracted light incident on each pixel of the image sensing unit 5 before the change unit changes the distance between the object 1 and the diffraction grating 4a. A superscript a of Fx, Fy, φx, and φy represents the diffraction order (a=0, ±1, . . . , ±K) of the illumination light path, and a subscript b represents the diffraction order (b=0, ±1, . . . , ±K) of the test light path. Let $\theta x_k$ be the deflection angle of diffracted light diffracted in the X direction, as shown in FIG. 4, and $\theta y_k$ be the deflection angle of diffracted light diffracted in the Y direction, as shown in FIG. 5. The phase change amounts Fx and Fy are given by $$Fx_b^a = \sin\theta x_a - \cos\theta x_a \tan\theta x_b$$
$$Fy_b^a = \sin\theta y_a - \cos\theta y_a \tan\theta y_b \qquad (2)$$

where k is the diffraction order to which the diffraction order a of the illumination light path or the diffraction order b of the test light path is input.

Hence, equation (1) can be expressed as $$I(x, y) = 2 \cdot (2 \cdot K + 1)^2 \cdot A + \qquad (3)$$
$$\sum_{a=-K}^{K} \sum_{b=-K}^{K} B\cos\left(\frac{2\pi}{T_x}(\sin\theta x_a - \cos\theta x_a \tan\theta x_b) \cdot Z(x, y) + \phi x_b^a(x, y)\right) + \sum_{a=-K}^{K} \sum_{b=-K}^{K} B\cos$$
$$\left(\frac{2\pi}{T_y}(\sin\theta y_a - \cos\theta y_a \tan\theta y_b) \cdot Z(x, y) + \phi y_b^a(x, y)\right)$$

When the change unit moves the diffraction grating 4a by ΔZ in the Z direction, the intensity I(x, y) of light detected in each pixel of the image sensing unit 5 is given by $$I(x, y) = 2 \cdot (2 \cdot K + 1)^2 \cdot A + \qquad (4)$$
$$\sum_{a=-K}^{K} \sum_{b=-K}^{K} B\cos\left(\frac{2\pi}{T_x}(\sin\theta x_a - \cos\theta x_a \tan\theta x_b) \cdot (Z(x, y) + \Delta Z) + \phi x_b^a(x, y)\right) + \sum_{a=-K}^{K} \sum_{b=-K}^{K} B\cos$$

$$\left(\frac{2\pi}{T_y}(\sin\theta y_a - \cos\theta y_a \tan\theta y_b) \cdot (Z(x, y) + \Delta Z) + \phi y_b^a(x, y)\right)$$

Using equations (3) and (4), a phase shift amount $\Delta\beta x$ of each diffracted light beam in the X direction generated by the movement of the diffraction grating 4a in the Z direction and a phase shift amount $\Delta\beta y$ of each diffracted light beam in the Y direction are given by $$\Delta\beta x_b^a = \frac{2\pi}{T_x}(\sin\theta x_a - \cos\theta x_a \tan\theta x_b)\Delta Z \quad (5)$$

$$\Delta\beta y_b^a = \frac{2\pi}{T_y}(\sin\theta y_a - \cos\theta y_a \tan\theta y_b)\Delta Z$$

The superscript a of $\Delta\beta x$ and $\Delta\beta y$ represents the diffraction order of the illumination light path, and the subscript b represents the diffraction order of the test light path.

When equation (4) is rewritten using equations (5), we obtain $$I_n(x, y) = 2 \cdot (2 \cdot K + 1)^2 \cdot A + \sum_{a=-K}^{K}\sum_{b=-K}^{K} B\cos(\phi x_b^a(x, y) + \Delta\beta x_b^a \cdot n) + \sum_{a=-K}^{K}\sum_{b=-K}^{K} B\cos(\phi y_b^a(x, y) + \Delta\beta y_b^a \cdot n) \quad (6)$$

where n is the number of an image captured by the image sensing unit 5 while changing the distance between the object 1 and the diffraction grating by the change unit.

Based on a window function $W_n$ and the intensity $I(x, y)$ of light detected in each pixel of the image sensing unit 5, the phases $\phi x(x, y)$ and $\phi y(x, y)$ can be obtained by $$G(x, y; \Delta\beta_b^a) = \sum_{n=0}^{N-1} I_n(x, y) W_n \exp(-i\Delta\beta_b^a \cdot n) \quad (7)$$

$$\phi_b^a(x, y) = \frac{\operatorname{Im}[G(x, y; \Delta\beta_b^a)]}{\operatorname{Re}[G(x, y; \Delta\beta_b^a)]} \quad (8)$$

where $G(x, y; \Delta\beta)$ is the intensity distribution of light detected by the image sensing unit 5.

At this time, the intensity of light detected in each pixel of the image sensing unit 5 is the synthesis of intensities of the diffracted light beams generated by the diffraction grating 4a. The phase of each diffracted light beam can selectively be calculated by meeting a condition to be described later. Complex representation of equation (6) is given by $$I_n(x, y) = \qquad (9)$$

$$2 \cdot (2K + 1)^2 A + \sum_{a=-K}^{K}\sum_{b=-K}^{K}\left(\frac{B(x, y)}{2}\exp[i\phi x_b^a(x, y)]\exp(i\Delta\beta_b^a \cdot n) + \frac{B(x, y)}{2}\exp[-i\phi x_b^a(x, y)]\exp(-i\Delta\beta_b^a \cdot n)\right) + \sum_{a=-K}^{K}\sum_{b=-K}^{K}\left(\frac{B(x, y)}{2}\exp[i\phi y_b^a(x, y)]\exp(i\Delta\beta_b^a \cdot n) + \frac{B(x, y)}{2}\exp[-i\phi y_b^a(x, y)]\exp(-i\Delta\beta_b^a \cdot n)\right)$$

When equation (9) is substituted into equation (7), we obtain $$Gs(x, y; \Delta\beta) = \qquad (10)$$

$$2 \cdot (2K + 1)^2 A W_f + \sum_{a=-K}^{K}\sum_{b=-K}^{K}\left(\frac{1}{2}B(x, y)\left(W_{\Delta\beta - \Delta\beta x_b^a}\exp(i\phi x_b^a(x, y)) + W_{\Delta\beta - \Delta\beta x_b^a}\exp(-i\phi x_b^a(x, y))\right)\right) + \sum_{a=-K}^{K}\sum_{b=-K}^{K}\left(\frac{1}{2}B(x, y)\left(W_{\Delta\beta - \Delta\beta y_b^a}\exp(i\phi y_b^a(x, y)) + W_{\Delta\beta - \Delta\beta y_b^a}\exp(-i\phi y_b^a(x, y))\right)\right)$$

where $W_f$ is a value obtained by Fourier-transforming the window function $W_n$, and is given by $$W_f = \sum_{n=0}^{N} W_n \exp(-i\Delta\beta \cdot n) \quad (11)$$

Hence, when the diffraction order a of the illumination light path is "+1", and the diffraction order b of the test light path is "0", an intensity distribution $Gs(x, y; \Delta\beta x)$ of light when $\Delta\beta = \Delta\beta x$ is given by $$Gs(x, y; \Delta\beta x_0^{+1}) = (2K + 1)^2 A W_{\Delta\beta x_0^{+1}} + \qquad (12)$$

$$\sum_{a=-K}^{K}\sum_{b=-K}^{K}\left(\frac{1}{2}B(x, y)\left(W_{\Delta\beta x_0^{+1} - \Delta\beta x_b^a}\exp(i\phi x_b^a(x, y)) + W_{\Delta\beta x_0^{+1} + \Delta\beta x_b^a}\exp(-i\phi x_b^a(x, y))\right)\right) + \sum_{a=-K}^{K}\sum_{b=-K}^{K}\left(\frac{1}{2}B(x, y)\left(W_{\Delta\beta x_0^{+1} - \Delta\beta y_b^a}\exp(i\phi y_b^a(x, y)) + W_{\Delta\beta x_0^{+1} + \Delta\beta y_b^a}\exp(-i\phi y_b^a(x, y))\right)\right)$$

where $a = 0, \pm 1, \ldots, \pm K$, and $b = a = 0, \pm 1, \ldots, \pm K$.

Under the condition that the components other than the value $W_f$ obtained by Fourier-transforming the window function $W_n$ are "0", that is, the frequency condition represented by $$W_{\Delta\beta x_0^{+1}} = 0,\ W_{\Delta\beta x_0^{+1} - \Delta\beta x_b^a} = 0,\ W_{\Delta\beta x_0^{+1} + \Delta\beta x_b^a} = 0, \quad (13)$$
$$W_{\Delta\beta x_0^{+1} - \Delta\beta y_b^a} = 0,\ W_{\Delta\beta x_0^{+1} + \Delta\beta y_b^a} = 0$$

the phase $\phi x$ when a is "+1" and b is "0" can be obtained using the light intensity distribution $Gs(x, y; \Delta\beta x)$. In a similar manner, the phases $\phi x$ and $\phi y$ of each diffracted light beam when $a = 0, \pm 1, \ldots, \pm K$, and $b = 0, \pm 1, \ldots, \pm K$ can be obtained. Here, the phase shift amount $\Delta\beta x$ in the X direction and the phase shift amount $\Delta\beta y$ in the Y direction, which meet the frequency condition of equations (13), are given by $$\Delta\beta x_b^a = \frac{2\pi \cdot Mx_b^a}{N},\ \Delta\beta y_b^a = \frac{2\pi \cdot My_b^a}{N}\ (Mx_b^a, My_b^a: \text{integer}) \quad (14)$$

N is the number (predetermined number) of images with which the phase of each diffracted light beam can be obtained.

To measure the shape of the object 1 by a synthetic wavelength, obtaining the phases of diffracted light beams of at least two orders suffices. Hence, it is only necessary that the phase shift amount of two light path components whose phases are to be calculated and that of the remaining light path component are different. For example, when synthesizing diffracted light when a=+1 and b=0 and diffracted light when a=−1 and b=0, it is only necessary to meet all conditions given by $$Mx_0^{+1} \neq Mx_b^a \; (a = 0, \pm 1, b = 0, \pm 1 \text{ except } a = +1, b = 0) \quad (15)$$

$$Mx_0^{+1} \neq My_b^a \; (a = 0, \pm 1, b = 0, \pm 1)$$

$$Mx_0^{-1} \neq Mx_b^a \; (a = 0, \pm 1, b = 0, \pm 1 \text{ except } a = -1, b = 0)$$

$$Mx_0^{-1} \neq My_b^a \; (a = 0, \pm 1, b = 0, \pm 1)$$

$$|Mx_b^a| \leq \frac{N}{2}, |My_b^a| \leq \frac{N}{2}$$

The orders a and b can arbitrarily be combined. When the diffraction grating 4a is moved in the Z direction by the moving amount ΔZ meeting the conditions of expressions (15), the phase of each diffracted light beam can accurately be obtained without causing crosstalk from each diffracted light beam. Deflection angles θx$_a$, θx$_b$, θy$_a$, and θy$_b$ of diffracted light are given by $$\theta x_a = \arcsin(a \cdot D_x \cdot \lambda + \sin \alpha_x)$$

$$\theta x_b = \arcsin(b \cdot D_x \cdot \lambda + \sin \alpha_x)$$

$$\theta y_a = \arcsin(a \cdot D_y \cdot \lambda + \sin \alpha_y)$$

$$\theta y_b = \arcsin(b \cdot D_y \cdot \lambda + \sin \alpha_y) \quad (16)$$

Hence, the phase shift amounts Δβx and Δβy of each diffracted light beam are given by $$\Delta \beta x_b^a = \frac{2\pi}{T_x}(a \cdot D_x \cdot \lambda + \sin\alpha_x - \quad (17)$$
$$\cos(\arcsin(a \cdot D_x \cdot \lambda + \sin\alpha_x))\tan(\arcsin(b \cdot D_x \cdot \lambda + \sin\alpha_x)))\Delta Z$$

$$\Delta \beta y_b^a = \frac{2\pi}{T_y}(a \cdot D_y \cdot \lambda + \sin\alpha_y - \cos(\arcsin(a \cdot D_y \cdot \lambda + \sin\alpha_y))$$
$$\tan(\arcsin(b \cdot D_y \cdot \lambda + \sin\alpha_y)))\Delta Z$$

For example, assume a case where a wavelength λ of the light source 2a is 800 nm, a diffraction grating constant D$_x$ of the diffraction grating 4a in the X direction is 602 lines/mm, and a diffraction grating constant D$_y$ of the diffraction grating 4a in the Y direction is 614 lines/mm considering 0th-order to ±1st-order diffracted light beams. Assume that an angle α$_x$ is 27.10°, an angle α$_y$ is 27.45°, a period T$_x$ is 0.95 mm, a period T$_y$ is 0.95 mm, and the moving amount ΔZ of the diffraction grating 4a is −0.43 mm. In this case, the phase shift amounts of the diffracted light beams in the X and Y directions can have values shown in Table 1 below. From equations (14) and (15), the predetermined number can be determined as "122".

TABLE 1

| | |
|---|---|
| X direction | $\Delta\beta x_0^{+1} = 43\pi/97$, $\Delta\beta x_0^{-1} = -37\pi/58$, $\Delta\beta x_{+1}^{0} = -29\pi/57$, $\Delta\beta x_{+1}^{-1} = -\pi$, $\Delta\beta x_{-1}^{+1} = 109\pi/83$, $\Delta\beta x_{-1}^{0} = 46\pi/51$, $\Delta\beta x_{-1}^{-1} = \Delta\beta x_0^{0} = \Delta\beta x_{+1}^{+1} = 0$ |
| Y direction | $\Delta\beta y_0^{+1} = 46\pi/51$, $\Delta\beta y_0^{-1} = -16\pi/25$, $\Delta\beta y_{+1}^{0} = -35\pi/69$, $\Delta\beta y_{+1}^{-1} = -\pi$ $\Delta\beta y_{-1}^{+1} = 16\pi/13$, $\Delta\beta y_{-1}^{0} = 83\pi/92$, $\Delta\beta y_{-1}^{-1} = \Delta\beta y_0^{0} = \Delta\beta y_{+1}^{+1} = 0$ |

By repeating steps S102 to S104 of FIG. 3 so as to cause the image sensing unit 5 to capture the thus determined predetermined number of images, the processing unit 7 can obtain the phases φx and φy of each diffracted light beam in each pixel of the image sensing unit 5 by $$\phi x_b^a(x, y) = \arctan\left(\frac{\sum_{k=1}^{N} I_k(x, y) \cdot \sin(\Delta\beta x_b^a \cdot (k-1))}{\sum_{k=1}^{N} I_k(x, y) \cdot \cos(\Delta\beta x_b^a \cdot (k-1))}\right) \quad (18)$$

$$\phi y_b^a(x, y) = \arctan\left(\frac{\sum_{k=1}^{N} I_k(x, y) \cdot \sin(\Delta\beta y_b^a \cdot (k-1))}{\sum_{k=1}^{N} I_k(x, y) \cdot \cos(\Delta\beta y_b^a \cdot (k-1))}\right)$$

That is, the processing unit 7 can obtain the phase distribution of each diffracted light beam on the imaging plane of the image sensing unit 5.

As described above, the measuring apparatus 10 according to the first embodiment includes, in the deflection unit 4, the diffraction grating 4a that diffracts pattern light emitted from the optical system 3 and generates diffracted light of a plurality of orders. The measuring apparatus 10 repeats the step of causing the change unit to change the distance between the object 1 and the diffraction grating 4a and causing the image sensing unit 5 to capture the object 1, thereby obtaining a plurality of images and obtaining the phases of each diffracted light beam based on the plurality of images. With the arrangement capable of irradiating the object 1 with a plurality of pattern light beams from different directions, the measuring apparatus 10 according to the first embodiment can perform measurement with fewer blind spots or measurement in a wider measurement range using a synthetic wavelength.

<Second Embodiment>

A measuring apparatus according to the second embodiment will be described. The measuring apparatus according to the second embodiment has the same apparatus arrangement as the measuring apparatus 10 according to the first embodiment, and a description thereof will be omitted here. The measuring apparatus according to the second embodiment not only causes a change unit (actuator 8) to change the distance between a diffraction grating 4a and an object 1 to be measured but also causes a conversion element 2c of an emitting unit 2 to change the period of the arrangement of bright and dark portions in pattern light. The measuring apparatus according to the second embodiment thus shifts the phase of each diffracted light beam incident on an image sensing unit 5.

Figure 6:
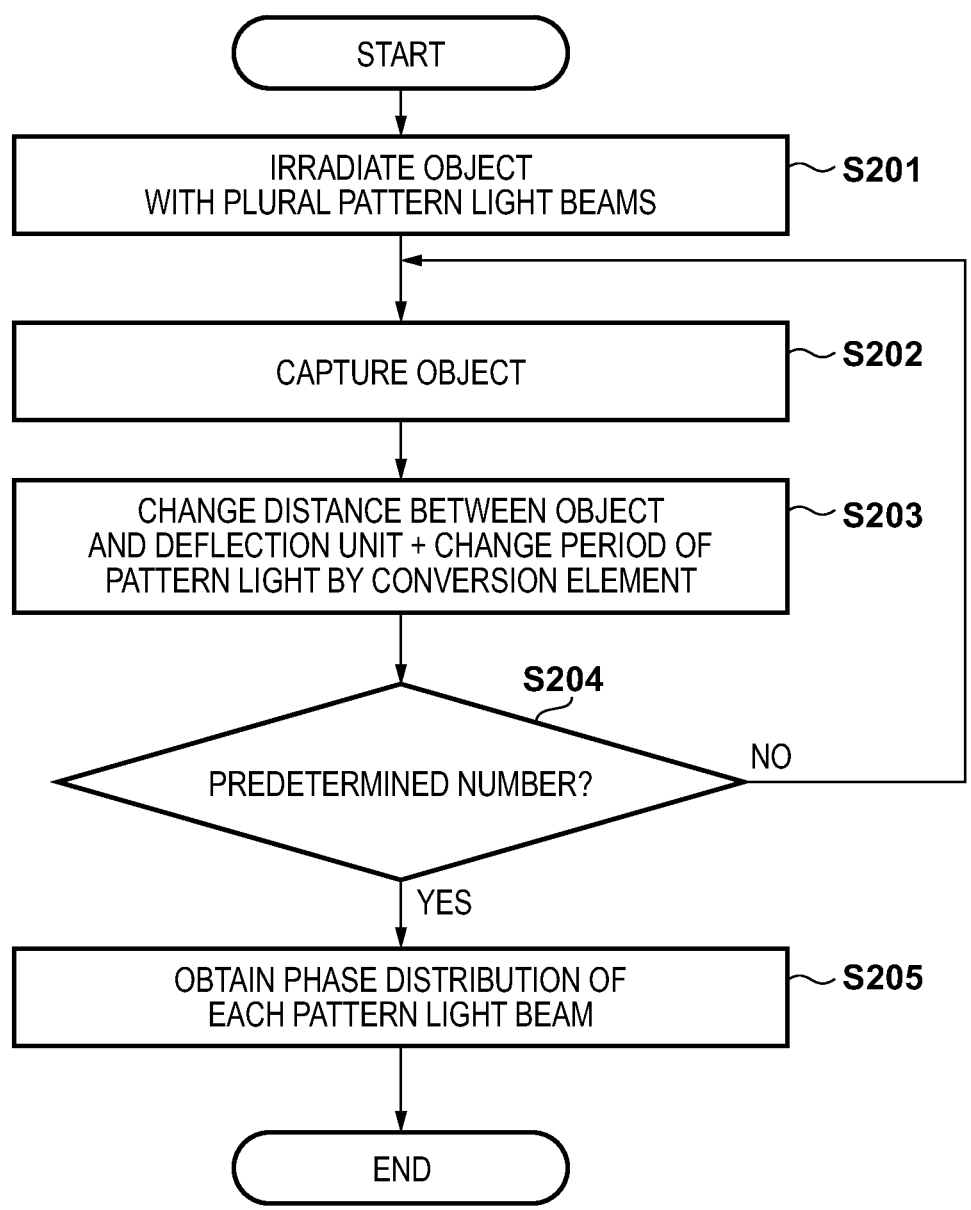
FIG. 6 is a flowchart showing a method of obtaining the phase distribution of each diffracted light beam on the imaging plane of an image sensing unit.

A method of obtaining the phase distribution of each diffracted light beam on the imaging plane of the image sensing unit 5 in the measuring apparatus according to the second embodiment will be described below with reference to FIG. 6. FIG. 6 is a flowchart showing the method of obtaining the phase distribution of each diffracted light beam on the imaging plane of the image sensing unit 5. In step S201, the processing unit 7 irradiates the object with a plurality of diffracted light beams (pattern light beams) generated by the diffraction grating 4a arranged to be tilted by an angle $\alpha_x$ in the X direction and an angle $\alpha_y$ in the Y direction with respect to the optical axis of an optical system 3, as shown in FIG. 2. In step S202, the processing unit 7 causes the image sensing unit 5 to capture the object 1 irradiated with the plurality of diffracted light beams. In step S203, the processing unit 7 causes the change unit to change the distance between the object 1 and a deflection unit 4 (diffraction grating 4a), and additionally, causes the conversion element 2c of the emitting unit 2 to change the period of the arrangement of bright and dark portions in pattern light. When the conversion element 2c includes a mask with a pattern on which optically transparent portions and light-shielding portions are periodically arranged, the processing unit 7 controls the conversion element 2c so that the mask moves in the Y direction or Z direction. On the other hand, when the conversion element 2c includes a liquid crystal element or a DMD, the processing unit 7 controls the conversion element 2c so as to individually drive a plurality of elements of the liquid crystal element or the DMD. This can shift the phases of the diffracted light beams incident on the image sensing unit 5 by phase shift amounts different from each other.

In step S204, the processing unit 7 determines whether the number of images captured by the image sensing unit 5 has reached a predetermined number. If the number of images captured by the image sensing unit 5 has not reached the predetermined number, the process returns to step S202 to cause the image sensing unit 5 to capture the object 1. On the other hand, if the number of images captured by the image sensing unit 5 has reached the predetermined number, the process advances to step S205. In step S205, the processing unit 7 obtains the phase distribution of each diffracted light beam on the imaging plane of the image sensing unit 5 based on the plurality of images captured by the image sensing unit 5.

Processing of causing the processing unit 7 to obtain the phase distribution of each diffracted light beam in accordance with the flowchart of FIG. 6 will be described next in detail. The object 1 is irradiated with the plurality of diffracted light beams generated by the diffraction grating 4a in a superimposed manner. At this time, there exist illumination light paths of diffracted light beams and test light paths as many as the number of diffracted light beams. Hence, letting k be an integer representing the diffraction order (k=0, ±1, ±2, . . . , ±K), a total of $2 \cdot (2 \cdot K+1)^2$ diffracted light beams including the plurality of diffracted light beams in the X direction and the plurality of diffracted light beams in the Y direction irradiate the object 1 in the superimposed manner. At this time, an intensity I(x, y) of light detected in each pixel of the image sensing unit 5 before phase shift of each diffracted light beam is performed by the change unit and the conversion element 2c is given by equation (3), as in the first embodiment. The intensity I(x, y) of light detected in each pixel of the image sensing unit 5 when the diffraction grating 4a is moved by the change unit by $\Delta Z$ in the Z direction is given by equation (4), as in the first embodiment. Letting $\xi_x$ be the change amount of the period of pattern light in the X direction by the conversion element 2c and $\xi_y$ be the change amount of the period of pattern light in the Y direction, the intensity I(x, y) of light detected in each pixel of the image sensing unit 5 is given by $$I(x, y) = 2 \cdot (2 \cdot K + 1)^2 \cdot A + \qquad (19)$$

$$\sum_{a=-K}^{K} \sum_{b=-K}^{K} B\cos\left(\frac{2\pi}{T_x}(\sin\theta x_a - \cos\theta x_a \tan\theta x_b) \cdot (Z(x,y) + \Delta Z) + \right.$$

$$\phi x_b^a(x, y) + \xi_x\Big) +$$

$$\sum_{a=-K}^{K} \sum_{b=-K}^{K} B\cos\left(\frac{2\pi}{T_y}(\sin\theta y_a - \cos\theta y_a \tan\theta y_b) \cdot (Z(x,y) + \Delta Z) + \right.$$

$$\phi y_b^a(x, y) + \xi_y\Big)$$

Using equations (3) and (19), phase shift amounts $\Delta\beta x$ and $\Delta\beta y$ of each diffracted light beam generated by the movement of the diffraction grating 4a and the change in the period of the pattern light are given by $$\Delta\beta x_b^a = \frac{2\pi}{T_x}(\sin\theta x_a - \cos\theta x_a \tan\theta x_b)\Delta Z + \xi_x \qquad (20)$$

$$\Delta\beta y_b^a = \frac{2\pi}{T_y}(\sin\theta y_a - \cos\theta y_a \tan\theta y_b)\Delta Z + \xi_y$$

Using equations (16), the phase shift amounts $\Delta\beta x$ and $\Delta\beta y$ of each diffracted light beam are given by $$\Delta\beta x_b^a = \frac{2\pi}{T_x}(a \cdot D_x \cdot \lambda + \sin\alpha_x - \cos(\arcsin(a \cdot D_x \cdot \lambda + \sin\alpha_x)) \qquad (21)$$

$$\tan(\arcsin(b \cdot D_x \cdot \lambda + \sin\alpha_x)))\Delta Z + \xi_x$$

$$\Delta\beta y_b^a = \frac{2\pi}{T_y}(a \cdot D_y \cdot \lambda + \sin\alpha_y - \cos(\arcsin(a \cdot D_y \cdot \lambda + \sin\alpha_y))$$

$$\tan(\arcsin(b \cdot D_y \cdot \lambda + \sin\alpha_y)))\Delta Z + \xi_y$$

The processing unit repeats the step of moving the diffraction grating 4a by the moving amount $\Delta Z$ so that equations (21) meet the conditions of equations (14) and (15) and changing the period of the pattern light by the change amounts $\xi_x$ and $\xi_y$ and causing the image sensing unit 5 to capture the object 1. The processing unit 7 can thus accurately obtain the phases of each diffracted light beam without causing crosstalk from each diffracted light beam. For example, assume a case where a wavelength $\lambda$ of the light source 2a is 800 nm, a diffraction grating constant $D_x$ of the diffraction grating 4a in the X direction is 625 lines/mm, and a diffraction grating constant $D_y$ of the diffraction grating 4a in the Y direction is 642 lines/mm considering 0th-order to ±1st-order diffracted light beams. Assume that an angle $\alpha_x$ is 19.52°, an angle $\alpha_y$ is 19.41°, a period $T_x$ is 0.95 mm, a period $T_y$ is 0.97 mm, and the moving amount $\Delta Z$ of the diffraction grating 4a is −0.43 mm. Also assume that the change amount $\xi_x$ of the period of the pattern light in the X direction is −0.056 rad, and the change amount $\xi_y$ of the period of the pattern light in the Y direction is −0.043 rad. In this case, the phase shift amounts of the diffracted light beams in the X direction and the phase shift amounts of the diffracted light beams in the Y direction can have values shown in Table 2 below. From equations (14) and (15), the predetermined number can be determined as "145".

TABLE 2

| | |
|---|---|
| X direction | $\Delta\beta x_0^{+1} = 29\pi/69, \Delta\beta x_0^{-1} = -19\pi/34,$ |
| | $\Delta\beta x_{+1}^{0} = -14\pi/27, \Delta\beta x_{+1}^{-1} = -73\pi/76,$ |
| | $\Delta\beta x_{-1}^{+1} = 95\pi/94, \Delta\beta x_{-1}^{0} = 21\pi/32,$ |
| | $\Delta\beta x_{-1}^{-1} = \Delta\beta x_0^{0} = \Delta\beta x_{+1}^{+1} = -\pi/56$ |
| Y direction | $\Delta\beta y_0^{+1} = 3\pi/7, \Delta\beta y_0^{-1} = -7\pi/13,$ |
| | $\Delta\beta y_{+1}^{0} = -11\pi/21, \Delta\beta y_{+1}^{-1} = -19\pi/20$ |
| | $\Delta\beta y_{-1}^{+1} = \pi, \Delta\beta y_{-1}^{0} = 40\pi/63,$ |
| | $\Delta\beta y_{-1}^{-1} = \Delta\beta y_0^{0} = \Delta\beta y_{+1}^{+1} = -\pi/71$ |

As described above, the measuring apparatus according to the second embodiment repeats the step of moving the diffraction grating 4a and changing the period of pattern light, and causing the image sensing unit 5 to capture the object 1, thereby obtaining a plurality of images and obtaining the phases of each diffracted light beam based on the plurality of images. The measuring apparatus according to the second embodiment can thus perform measurement with fewer blind spots or measurement in a wider measurement range using a synthetic wavelength, like the measuring apparatus 10 according to the first embodiment.

The measuring apparatus according to the second embodiment changes the phases of each diffracted light beam by moving the diffraction grating 4a in the Z direction and changing the period of pattern light. However, the present invention is not limited to this. For example, the phases of each diffracted light beam may be changed by moving the diffraction grating 4a in the Z direction and additionally changing the tilt of the diffraction grating 4a so as to change the incident angle of the pattern light with respect to the diffraction grating 4a. In this case, the measuring apparatus includes, for example, a second change unit that changes the tilt of the diffraction grating 4a, and the tilt of the diffraction grating 4a can be changed by the second change unit. The second change unit according to the second embodiment can be included in, for example, the change unit. The phases of each diffracted light beam may be also changed simultaneously using moving the diffraction grating 4a in the Z direction, changing the period of pattern light, and changing the angle of the diffraction grating 4a.

<Third Embodiment>

Figure 7:
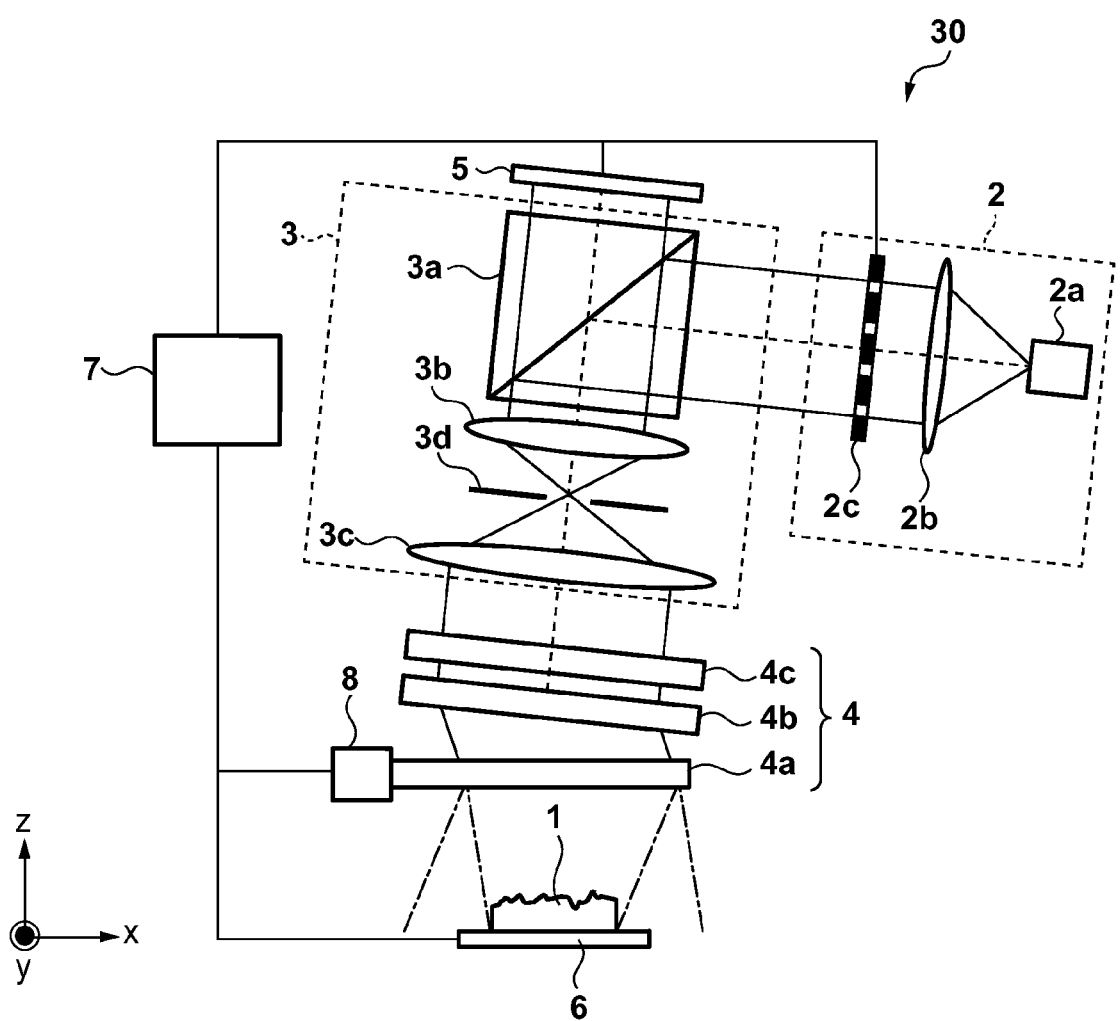
FIG. 7 is a schematic view showing a measuring apparatus according to the third embodiment.

A measuring apparatus 30 according to the third embodiment will be described. FIG. 7 is a schematic view showing the measuring apparatus 30 according to the third embodiment. As compared to the measuring apparatus 10 according to the first embodiment, the measuring apparatus 30 according to the third embodiment provides a deflection unit 4 with a polarization diffraction grating 4b whose diffraction efficiency (deflection direction) conspicuously changes depending on the polarization state of incident light and a waveplate 4c. In the measuring apparatus 30 according to the third embodiment, an optical system 3 is arranged to be tilted so that the deflection direction of the polarization diffraction grating 4b becomes parallel to the Z direction, and the polarization diffraction grating 4b and the waveplate 4c are arranged such that pattern light emitted from the optical system 3 is vertically incident on them. A light source 2a of an emitting unit 2 is configured to emit light (linearly polarized light) having only deflection components in a certain direction. The pattern light incident on the deflection unit 4 (waveplate 4c) thus has the polarization state of linearly polarized light. When the polarization state of the pattern light incident on the deflection unit 4 is set to linearly polarized light, diffracted light beams diffracted by the polarization diffraction grating 4b can be limited, and incidence of extra diffracted light on an image sensing unit 5 can be reduced. As described above, the measuring apparatus 30 according to the third embodiment can increase the phase difference between the diffracted light of a plurality of orders by controlling the polarization state of the pattern light using the waveplate 4c and thus making the light path of illumination light different from that of test light. The arrangement of each component of the measuring apparatus 30 according to the third embodiment is the same as in the measuring apparatus 10 according to the first embodiment, and a description thereof will be omitted.

Figure 9:
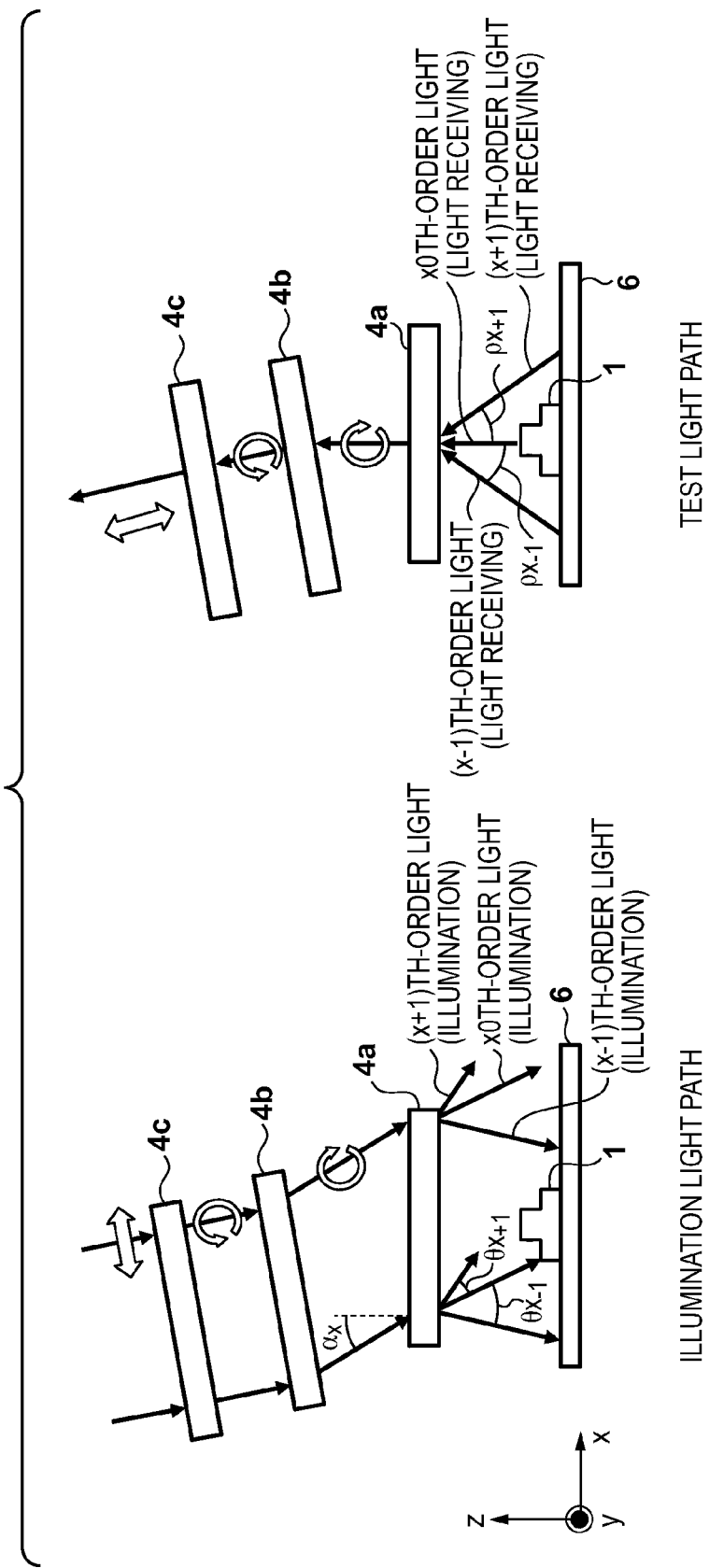
FIG. 9 is a schematic view showing the arrangement of the constituent elements of the deflection unit in the X direction.
Figure 10:
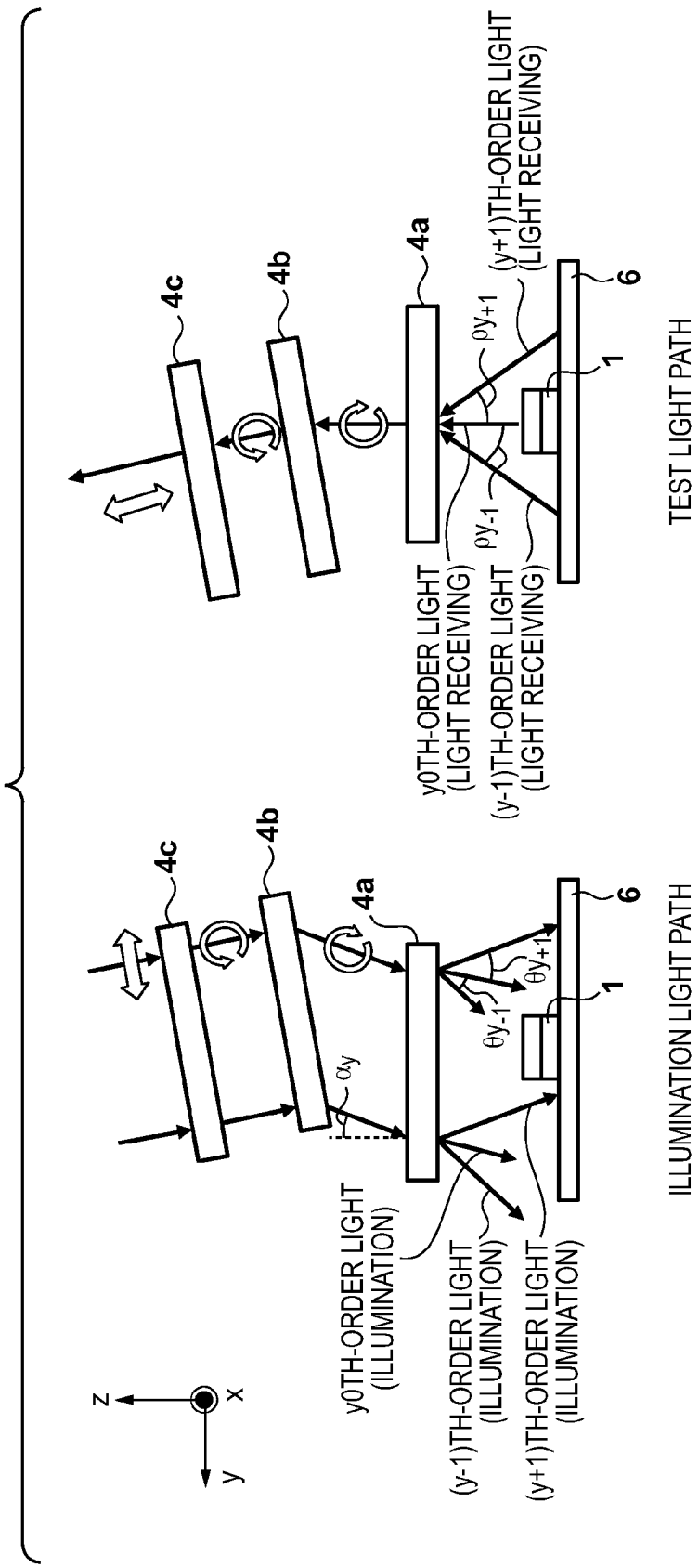
FIG. 10 is a schematic view showing the arrangement of the constituent elements of the deflection unit in the Y direction.

Like the measuring apparatus 10 according to the first embodiment, the measuring apparatus 30 according to the third embodiment can obtain the phase distribution of each diffracted light beam on the imaging plane of the image sensing unit 5 by performing the steps of the flowchart shown in FIG. 3. In step S101, the processing unit 7 irradiates an object 1 to be measured with a plurality of diffracted light beams (pattern light beams) generated by a diffraction grating 4a of the deflection unit 4, as shown in FIGS. 8 to 10. FIG. 8 is a schematic view showing the arrangement of the constituent elements of the deflection unit 4. FIG. 9 is a schematic view showing the arrangement of the constituent elements of the deflection unit 4 in the X direction. FIG. 10 is a schematic view showing the arrangement of the constituent elements of the deflection unit 4 in the Y direction. The left view of each of FIGS. 9 and 10 shows the illumination light paths, and the right view shows the test light paths. As shown in FIGS. 8 to 10, when the polarization state of pattern light incident on the deflection unit 4 is set to linearly polarized light, the pattern light is converted into circularly polarized light by the waveplate 4c, deflected by the polarization diffraction grating 4b, and is incident on the diffraction grating 4a with an angle. The angle (incident angle) of the pattern light that is emitted from the polarization diffraction grating 4b and is incident on the diffraction grating 4a is set to an angle $\alpha_x$ in the X direction and an angle $\alpha_y$ in the Y direction. Steps S102 to S105 are the same as the steps of the measuring apparatus 10 according to the first embodiment, and a description thereof will be omitted here.

Processing of causing the processing unit 7 to obtain the phase distribution of each diffracted light beam in accordance with the flowchart of FIG. 3 will be described next in detail. An intensity I(x, y) of light detected in each pixel of the image sensing unit 5 is given by equation (3), as in the first embodiment. As shown in FIG. 9, let $\theta x_k$ be the deflection angle of diffracted light deflected by the diffraction grating 4a, and $\rho x_k$ be the light-receiving angle at which the diffracted light reflected by the object 1 is received by the diffraction grating 4a in the X direction. As shown in FIG. 10, let $\theta y_k$ be the deflection angle of diffracted light deflected by the diffraction grating, and $\rho y_k$ be the light-receiving angle at which the diffracted light reflected by the object is received by the diffraction grating in the Y direction. At this time, a phase change amount Fx in the X direction and a phase shift amount Fy in the Y direction are given by $$Fx_b^a = \sin\theta x_a - \cos\theta x_a \tan\rho x_b$$

$$Fy_b^a = \sin\theta y_a - \cos\theta y_a \tan\rho y_b \quad (22)$$

where k is the diffraction order to which the diffraction order a (a=0, ±1 . . . , ±K) of the illumination light path or the diffraction order b (b=0, ±1 . . . , ±K) of the test light path is input.

When the deflection unit 4 moves the diffraction grating 4a by $\Delta Z$ in the Z direction, the intensity I(x, y) of light detected in each pixel of the image sensing unit 5 is given by $$I(x, y) = 2 \cdot (2 \cdot K + 1)^2 \cdot A + \quad (23)$$

$$\sum_{a=-K}^{K} \sum_{b=-K}^{K} B\cos\left(\frac{2\pi}{T_x}(\sin\theta x_a - \cos\theta x_a \tan\rho x_b) \cdot (Z(x, y) + \Delta Z) + \phi x_b^a(x, y)\right) + \sum_{a=-K}^{K} \sum_{b=-K}^{K} B\cos\left(\frac{2\pi}{T_y}(\sin\theta y_a - \cos\theta y_a \tan\rho y_b) \cdot (Z(x, y) + \Delta Z) + \phi y_b^a(x, y)\right)$$

Using equation (23), a phase shift amount $\Delta\beta x$ of each diffracted light beam in the X direction generated by the movement of the diffraction grating 4a in the Z direction and a phase shift amount $\Delta\beta y$ of each diffracted light beam in the Y direction are given by $$\Delta\beta x_b^a = \frac{2\pi}{T_x}(\sin\theta x_a - \cos\theta x_a \tan\rho x_b)\Delta Z \quad (24)$$

$$\Delta\beta y_b^a = \frac{2\pi}{T_y}(\sin\theta y_a - \cos\theta y_a \tan\rho y_b)\Delta Z$$

The light-receiving angles $\rho x_k$ and $\rho y_k$ are given by $$\rho x_b = \arcsin(b \cdot D_x \cdot \lambda)$$

$$\rho y_b = \arcsin(b \cdot D_y \cdot \lambda) \quad (25)$$

Deflection angles $\theta x_a$ and $\theta y_a$ are given by equations (16). Hence, the phase shift amounts $\Delta\beta x$ and $\Delta\beta y$ of each diffracted light beam are given by $$\Delta\beta x_b^a = \frac{2\pi}{T_x}(a \cdot D_x \cdot \lambda + \sin\alpha_x - \quad (26)$$
$$\cos(\arcsin(a \cdot D_x \cdot \lambda + \sin\alpha_x))\tan(\arcsin(b \cdot D_x \cdot \lambda)))\Delta Z$$

$$\Delta\beta y_b^a = \frac{2\pi}{T_y}(a \cdot D_y \cdot \lambda + \sin\alpha_y - $$
$$\cos(\arcsin(a \cdot D_y \cdot \lambda + \sin\alpha_y))\tan(\arcsin(b \cdot D_y \cdot \lambda)))\Delta Z$$

The processing unit 7 repeats the step of moving the diffraction grating 4a by the moving amount $\Delta Z$ so that equations (26) meet the conditions of equations (14) and (15) and causing the image sensing unit 5 to capture the object 1, as in the first embodiment. The processing unit 7 can thus accurately obtain the phases of each diffracted light beam without causing crosstalk from each diffracted light beam. For example, assume a case where a wavelength $\lambda$ of the light source 2a is 800 nm, a diffraction grating constant $D_x$ of the diffraction grating 4a in the X direction is 572 lines/mm, and a diffraction grating constant $D_y$ of the diffraction grating 4a in the Y direction is 572 lines/mm considering 0th-order to $\pm$1st-order diffracted light beams. Assume that an angle $\alpha_x$ is 27.20°, an angle $\alpha_y$ is 27.20°, a period $T_x$ is 0.1 mm, a period $T_y$ is 0.05 mm, and the moving amount $\Delta Z$ of the diffraction grating 4a is −0.017 mm. In this case, the phase shift amounts of the diffracted light beams in the X and Y directions can have values shown in Table 3 below. From equations (14) and (15), the predetermined number can be determined as "100".

TABLE 3

| | |
|---|---|
| X direction | $\Delta\beta x_0^{+1} = -4\pi/25$, $\Delta\beta x_0^{-1} = 11\pi/50$, $\Delta\beta x_{+1}^{0} = 9\pi/50$, $\Delta\beta x_{+1}^{-1} = 9\pi/25$, $\Delta\beta x_{-1}^{+1} = -8\pi/25$, $\Delta\beta x_{-1}^{0} = -9\pi/50$, $\Delta\beta x_{-1}^{-1} = 2\pi/25$, $\Delta\beta x_0^{0} = \Delta\beta x_{+1}^{+1} = 0$ |
| Y direction | $\Delta\beta y_0^{+1} = -8\pi/25$, $\Delta\beta y_0^{-1} = 22\pi/50$, $\Delta\beta y_{+1}^{0} = 18\pi/50$, $\Delta\beta y_{+1}^{-1} = 4\pi/25$, $\Delta\beta y_{-1}^{+1} = -16\pi/25$, $\Delta\beta y_{-1}^{0} = -18\pi/50$, $\Delta\beta y_{-1}^{-1} = 4\pi/25$, $\Delta\beta y_0^{0} = \Delta\beta y_{+1}^{+1} = 0$ |

As described above, in the measuring apparatus 30 according to the third embodiment, the deflection unit 4 is provided with the polarization diffraction grating 4b whose deflection direction changes depending on the polarization state and the waveplate 4c. The optical system 3 is arranged to be tilted so that the deflection direction of the polarization diffraction grating 4b becomes parallel to the Z direction. The measuring apparatus 30 according to the third embodiment repeats the step of moving the diffraction grating 4a and causing the image sensing unit 5 to capture the object 1, thereby obtaining a plurality of images and obtaining the phases of each diffracted light beam based on the plurality of images. The measuring apparatus 30 according to the third embodiment can thus perform measurement with fewer blind spots or measurement in a wider measurement range using a synthetic wavelength, like the measuring apparatus 10 according to the first embodiment.

<Fourth Embodiment>

A measuring apparatus according to the fourth embodiment will be described. The measuring apparatus according to the fourth embodiment has the same apparatus arrangement as the measuring apparatus 30 according to the third embodiment, and a description thereof will be omitted here. The measuring apparatus according to the fourth embodiment not only causes a change unit to change the distance between a diffraction grating 4a and an object 1 to be measured but also causes a conversion element 2c of an emitting unit 2 to change the period of the arrangement of bright and dark portions in pattern light, thereby shifting the phase of each diffracted light beam incident on an image sensing unit 5. The measuring apparatus according to the fourth embodiment can obtain the phase distribution of each diffracted light beam on the imaging plane of the image sensing unit 5 by performing the steps of the flowchart shown in FIG. 6, like the measuring apparatus according to the second embodiment. The steps (steps S201 to S205) of the flowchart of FIG. 6 are the same as in the second embodiment, and a description thereof will be omitted here.

Processing of causing a processing unit 7 to obtain the phase distribution of each diffracted light beam in accordance with the flowchart of FIG. 6 will be described next in detail. An intensity I(x, y) of light detected in each pixel of the image sensing unit 5 before phase shift of each diffracted light beam is performed by a change unit and the conversion element 2c is given by equation (3), as in the third embodiment. The intensity I(x, y) of light detected in each pixel of the image sensing unit 5 when the diffraction grating 4a is moved by the change unit by $\Delta Z$ in the Z direction is given by equation (23), as in the third embodiment. Let $\xi_x$ be the change amount of the period of pattern light in the X direction by the conversion element 2c and $\xi_y$ be the change amount of the period of pattern light in the Y direction. Using equation (23), the intensity I(x, y) of light detected in each pixel of the image sensing unit 5 is given by $$I(x, y) = 2 \cdot (2 \cdot K + 1)^2 \cdot \quad (27)$$

$$A + \sum_{a=-K}^{K} \sum_{b=-K}^{K} B \cos\left(\frac{2\pi}{T_x}(\sin\theta x_a - \cos\theta x_a \tan\rho x_b) \cdot (Z(x, y) + \Delta Z) + \phi x_b^a(x, y) + \xi_x\right) +$$

$$\sum_{a=-K}^{K} \sum_{b=-K}^{K} B \cos\left(\frac{2\pi}{T_y}(\sin\theta y_a - \cos\theta y_a \tan\rho y_b) \cdot (Z(x, y) + \Delta Z) + \phi y_b^a(x, y) + \xi_y\right)$$

Using equations (3) and (27), phase shift amounts $\Delta\beta x$ and $\Delta\beta y$ of each diffracted light beam generated by the movement of the diffraction grating 4a and the change in the period of the pattern light are given by $$\Delta\beta x_b^a = \frac{2\pi}{T_x}(\sin\theta x_a - \cos\theta x_a \tan\rho x_b)\Delta Z + \xi_x \quad (28)$$

$$\Delta\beta y_b^a = \frac{2\pi}{T_y}(\sin\theta y_a - \cos\theta y_a \tan\rho y_b)\Delta Z + \xi_y$$

Using equations (25) and (16), the phase shift amounts $\Delta\beta x$ and $\Delta\beta y$ of each diffracted light beam represented by equations (28) are given by $$\Delta\beta x_b^a = \frac{2\pi}{T_x}(a \cdot D_x \cdot \lambda + \sin\alpha_x - \quad (29)$$
$$\cos(\arcsin(a \cdot D_x \cdot \lambda + \sin\alpha_x))\tan(\arcsin(b \cdot D_x \cdot \lambda)))\Delta Z + \xi_x$$

$$\Delta\beta y_b^a = \frac{2\pi}{T_y}(a \cdot D_y \cdot \lambda + \sin\alpha_y - \cos(\arcsin(a \cdot D_y \cdot \lambda + \sin\alpha_y))$$
$$\tan(\arcsin(b \cdot D_y \cdot \lambda)))\Delta Z + \xi_y$$

The processing unit 7 repeats the step of moving the diffraction grating 4a by the moving amount $\Delta Z$ so that equations (29) meet the conditions of equations (14) and (15) and changing the period of the pattern light by the change amounts $\xi_x$ and $\xi_y$ and causing the image sensing unit 5 to capture the object 1. The processing unit 7 can thus accurately obtain the phases of each diffracted light beam without causing crosstalk from each diffracted light beam. For example, assume a case where a wavelength $\lambda$ of a light source 2a is 800 nm, a diffraction grating constant $D_x$ of the diffraction grating 4a in the X direction is 572 lines/mm, and a diffraction grating constant $D_y$ of the diffraction grating 4a in the Y direction is 572 lines/mm considering 0th-order to ±1st-order diffracted light beams. Assume that an angle $\alpha_x$ is 27.20°, an angle $\alpha_y$ is 27.20°, a period $T_x$ is 0.1 mm, a period $T_y$ is 0.1 mm, and the moving amount $\Delta Z$ of the diffraction grating 4a is 0.034 mm. Also assume that the change amount $\xi_x$ of the period of the pattern light in the X direction is −0.25 rad, and the change amount $\xi_y$ of the period of the pattern light in the Y direction is 0.50 rad. In this case, the phase shift amounts of the diffracted light beams in the X and Y directions can have values shown in Table 4 below. From equations (14) and (15), the predetermined number can be determined as "50".

TABLE 4

| | |
|---|---|
| X direction | $\Delta\beta x_0^{+1} = -10\pi/25$, $\Delta\beta x_0^{-1} = 9\pi/25$, $\Delta\beta x_{+1}^{0} = 7\pi/25$, $\Delta\beta x_{+1}^{-1} = 16\pi/25$, $\Delta\beta x_{-1}^{+1} = -18\pi/25$, $\Delta\beta x_{-1}^{0} = -9\pi/25$, $\Delta\beta x_{-1}^{-1} = 2\pi/25$, $\Delta\beta x_0^{0} = \Delta\beta x_{+1}^{+1} = -2\pi/25$ |
| Y direction | $\Delta\beta y_0^{+1} = -12\pi/25$, $\Delta\beta y_0^{-1} = 7\pi/25$, $\Delta\beta y_{+1}^{0} = 5\pi/25$, $\Delta\beta y_{+1}^{-1} = 14\pi/25$, $\Delta\beta y_{-1}^{+1} = -16\pi/25$, $\Delta\beta y_{-1}^{0} = -13\pi/25$, $\Delta\beta y_{-1}^{-1} = 0$, $\Delta\beta y_0^{0} = \Delta\beta y_{+1}^{+1} = -4\pi/25$ |

As described above, in the measuring apparatus according to the fourth embodiment, the deflection unit 4 is provided with the polarization diffraction grating 4b whose deflection direction changes depending on the polarization state and the waveplate 4c. The optical system 3 is arranged to be tilted so that the deflection direction of the polarization diffraction grating 4b becomes parallel to the Z direction. The measuring apparatus according to the fourth embodiment repeats the step of moving the diffraction grating 4a and changing the period of pattern light, and causing the image sensing unit 5 to capture the object 1, thereby obtaining a plurality of images and obtaining the phases of each diffracted light beam based on the plurality of images. The measuring apparatus according to the fourth embodiment can thus perform measurement with fewer blind spots or measurement in a wider measurement range using a synthetic wavelength.

<Fifth Embodiment>

A measuring apparatus 50 according to the fifth embodiment of the present invention will be described with reference to FIG. 11. The measuring apparatus 50 according to the fifth embodiment is different from the measuring apparatus 10 according to the first embodiment in the arrangement of a deflection unit 4. In the fifth embodiment, the deflection unit 4 can include a liquid crystal element 4d capable of changing the polarization state of pattern light emitted from an optical system 3, and a polarization diffraction grating 4e whose diffraction efficiency (deflection direction) conspicuously changes depending on the polarization state of the pattern light emitted from the liquid crystal element 4d. The measuring apparatus 50 causes a processing unit 7 to control the liquid crystal element 4d such that the pattern light is deflected inward from outside of the polarization diffraction grating 4e and irradiates an object 1 to be measured. The measuring apparatus 50 can thus limit the region where the pattern light irradiates the object 1 and also reduce generation of signals unnecessary for measurement.

Figure 11:
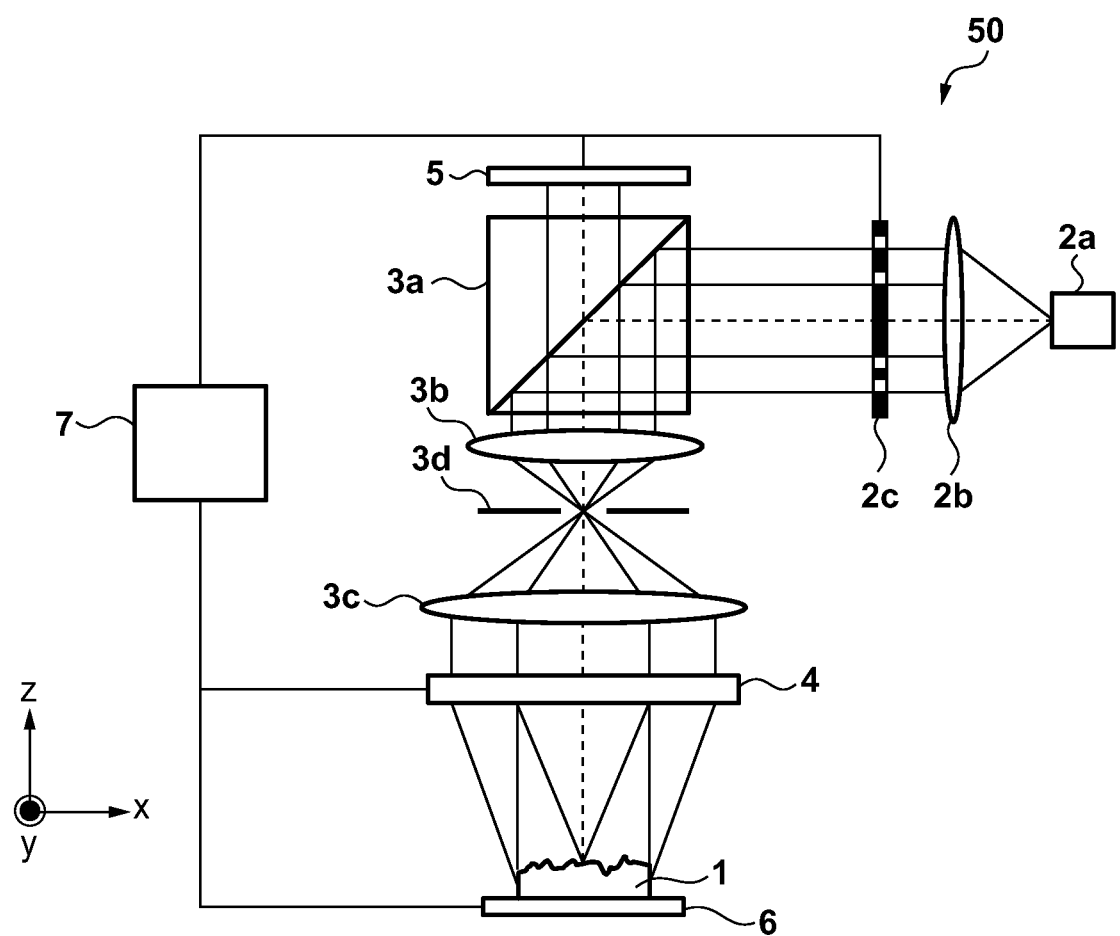
FIG. 11 is a schematic view showing a measuring apparatus according to the fifth embodiment.

FIG. 11 is a schematic view showing the measuring apparatus 50 according to the fifth embodiment. The measuring apparatus 50 according to the fifth embodiment can include an emitting unit 2, the optical system 3, the deflection unit 4, an image sensing unit 5, a stage 6, and the processing unit 7. A light source 2a of the emitting unit 2 emits light (linearly polarized light) having only deflection components in a certain direction. The light emitted from the light source 2a is collimated by a collimator lens 2b and is then incident on a conversion element 2c so as to be converted into pattern light having a periodical arrangement of bright and dark portions. The conversion element 2c can use, for example, a mask with a pattern on which optically transparent portions and light-shielding portions are periodically (alternately) arranged, a liquid crystal element, or a digital mirror device. The central portion of the conversion element 2c shields light so that the pattern light is incident on only the peripheral portion of the deflection unit 4. The pattern light emitted from the emitting unit 2 is reflected by a polarizing beam splitter 3a in the optical system 3 and passed through two objective lenses 3b and 3c so as to be emitted from the optical system 3 with a larger diameter and incident on the deflection unit 4.

Figure 12:
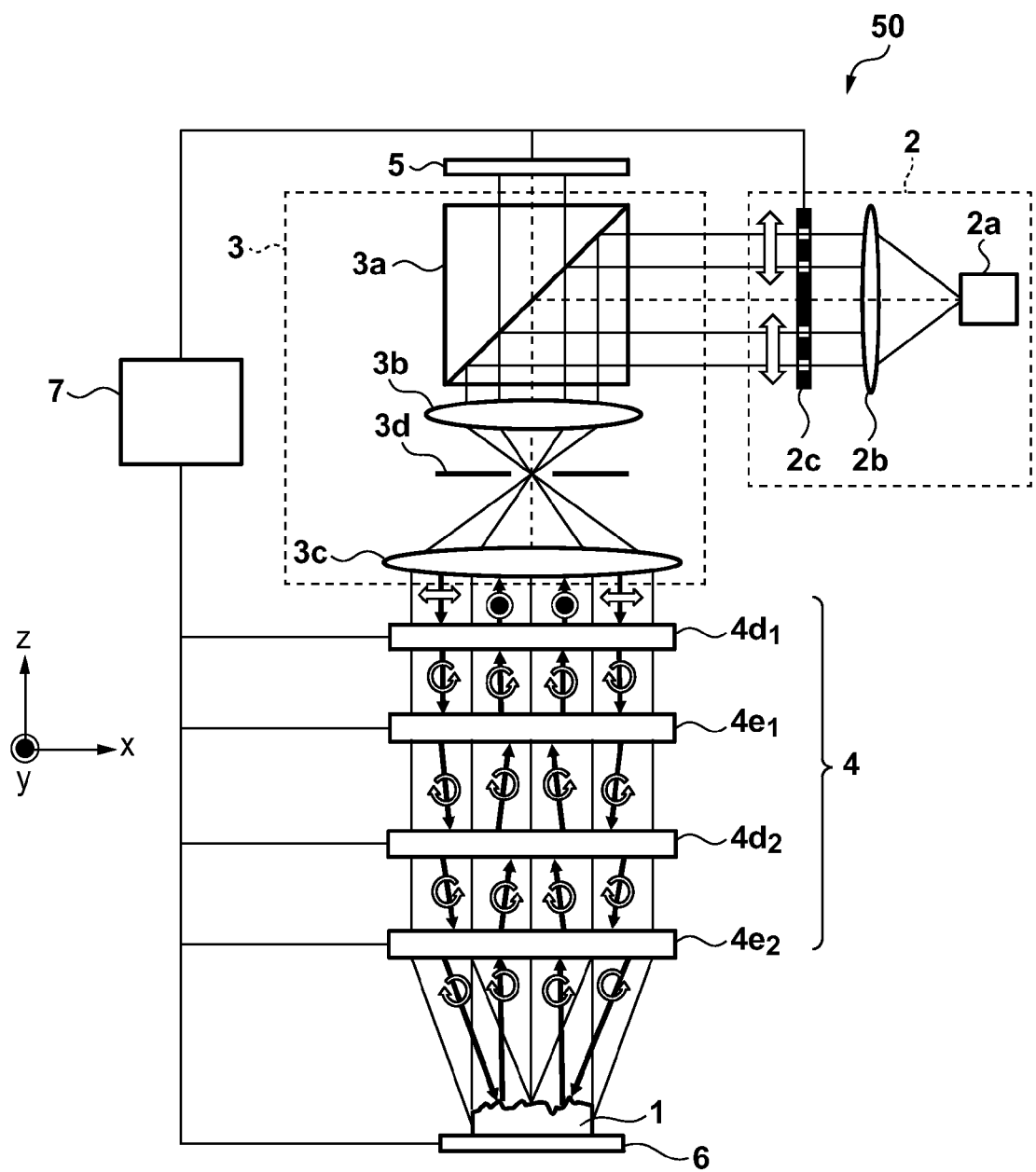
FIG. 12 is a schematic view showing the measuring apparatus according to the fifth embodiment.

The arrangement of the deflection unit 4 according to the fifth embodiment will be described here with reference to FIG. 12. FIG. 12 is a schematic view showing the measuring apparatus 50 according to the fifth embodiment in which the arrangement of the deflection unit 4 is illustrated. As described above, the deflection unit 4 includes the liquid crystal element 4d capable of changing the polarization state of pattern light emitted from the optical system 3, and the polarization diffraction grating 4e whose diffraction efficiency conspicuously changes depending on the polarization state of the pattern light emitted from the liquid crystal element 4d. In the deflection unit 4 shown in FIG. 12, two liquid crystal elements $4d_2$ and $4d_2$ and two polarization diffraction gratings $4e_2$ and $4e_2$ are alternately arranged along the Z direction. As shown in FIG. 13, the polarization diffraction grating 4e can deflect pattern light in a direction that changes between a case where left-handed circularly polarized pattern light is incident (left view) and a case where right-handed circularly polarized pattern light is incident (right view).

Referring to FIG. 12, pattern light (linearly polarized light in the X direction) incident on the left end of the first liquid crystal element $4d_2$ undergoes polarization state control by the liquid crystal element $4d_2$ and is emitted as left-handed circularly polarized light. The pattern light that has changed to the left-handed circularly polarized light is incident on the peripheral portion (left end) of the first polarization diffraction grating $4e_2$. At this time, the pattern light incident on the polarization diffraction grating $4e_2$ is left-handed circularly polarized light and is therefore deflected in the +X direction in FIG. 12 and also converted into right-handed circularly polarized light. The pattern light deflected by the polarization diffraction grating $4e_2$ is incident on the left end of the second liquid crystal element $4d_2$. After having undergone polarization state control, the pattern light is emitted from the liquid crystal element $4d_2$ as left-handed circularly polarized light. The pattern light that has changed to the left-handed circularly polarized light is incident on the peripheral portion (left end) of the second polarization diffraction grating $4e_2$. The pattern light is deflected in the +X direction in FIG. 12 by the polarization diffraction grating $4e_2$ and irradiates the left region of the object 1.

On the other hand, referring to FIG. 12, pattern light (linearly polarized light) incident on the right end of the first liquid crystal element $4d_1$ undergoes polarization state control by the liquid crystal element $4d_1$ and is emitted as right-handed circularly polarized light. The pattern light that has changed to the right-handed circularly polarized light is incident on the peripheral portion (right end) of the first polarization diffraction grating $4e_1$. The pattern light is deflected in the −X direction in FIG. 12 and also converted into left-handed circularly polarized light by the polarization diffraction grating $4e_1$. The pattern light deflected by the polarization diffraction grating $4e_1$ is incident on the right end of the second liquid crystal element $4d_2$. After having undergone polarization state control, the pattern light is emitted from the liquid crystal element $4d_2$ as right-handed circularly polarized light. The pattern light that has changed to the right-handed circularly polarized light is incident on the peripheral portion (right end) of the second polarization diffraction grating $4e_2$. The pattern light is deflected in the −X direction in FIG. 12 by the polarization diffraction grating $4e_2$ and irradiates the right region of the object 1.

The pattern light reflected by the left region of the object 1 is partially vertically incident on the left side of the central portion of the polarization diffraction grating $4e_2$. The pattern light incident on the polarization diffraction grating $4e_2$ is right-handed circularly polarized light and is therefore deflected in the +X direction in FIG. 12 and also converted into left-handed circularly polarized light by the polarization diffraction grating $4e_2$. The pattern light that has changed to the left-handed circularly polarized light is incident on the liquid crystal element $4d_2$, undergoes polarization state control, and is incident on the polarization diffraction grating $4e_1$ as right-handed circularly polarized light. The pattern light incident on the polarization diffraction grating $4e_1$ is deflected in the +X direction in FIG. 12 and also converted into left-handed circularly polarized light by the polarization diffraction grating $4e_1$, and is incident on the liquid crystal element $4d_1$. The pattern light incident on the liquid crystal element $4d_1$ undergoes polarization state control and is vertically emitted from the liquid crystal element $4d_1$ as linearly polarized light in the Y direction.

The pattern light reflected by the right region of the object 1 is partially vertically incident on the right side of the central portion of the polarization diffraction grating $4e_2$. The pattern light incident on the polarization diffraction grating $4e_2$ is left-handed circularly polarized light and is therefore deflected in the −X direction in FIG. 12 and also converted into right-handed circularly polarized light by the polarization diffraction grating $4e_2$. The pattern light that has changed to the right-handed circularly polarized light is incident on the liquid crystal element $4d_2$, undergoes polarization state control, and is incident on the polarization diffraction grating $4e_1$ as left-handed circularly polarized light. The pattern light incident on the polarization diffraction grating $4e_1$ is deflected in the −X direction in FIG. 12 and also converted into right-handed circularly polarized light by the polarization diffraction grating $4e_1$, and is incident on the liquid crystal element $4d_1$. The pattern light incident on the liquid crystal element $4d_1$ undergoes polarization state control and is vertically emitted from the liquid crystal element $4d_1$ as linearly polarized light in the Y direction.

The pattern light vertically emitted from the liquid crystal element $4d_2$ is converged by the objective lens 3c, passes through an aperture stop 3d, and is incident on the polarizing beam splitter 3a. The pattern light incident on the polarizing beam splitter 3a is linearly polarized light in the Y direction, and therefore passes through the polarizing beam splitter 3a and is incident on the image sensing unit 5. In the measuring apparatus 50 according to the fifth embodiment, pattern light that is reflected by the object 1 and is vertically incident on the deflection unit 4 (polarization diffraction grating $4e_2$) is vertically emitted from the deflection unit 4 (liquid crystal element $4d_2$) and can therefore pass through the aperture stop 3d. On the other hand, pattern light that is reflected by the object 1 but is not vertically incident on the deflection unit 4 is not vertically emitted from the deflection unit 4 and is therefore blocked by the aperture stop 3d. Hence, the measuring apparatus 50 according to the fifth embodiment can make only pattern light reflected with a predetermined convergence angle with respect to the pattern light that irradiates the object 1 be incident on the image sensing unit 5 and reduce generation of signals unnecessary for measurement in the image sensing unit 5. As in the first to fourth embodiments, the measuring apparatus 50 according to the fifth embodiment may repeat the step of changing the distance between the deflection unit 4 and the object 1 or changing the period of the pattern light and causing the image sensing unit 5 to capture the object 1, thereby obtaining a plurality of images. The measuring apparatus 50 according to the fifth embodiment can change the region of the object 1 irradiated with pattern light as shown in FIG. 14, by controlling the conversion element 2c of the emitting unit 2 or the liquid crystal element 4d of the deflection unit 4.

<Embodiment of Method of Manufacturing Article>

A method of manufacturing an article according to an embodiment of the present invention is used to, for example, manufacture an article such as a metal part or optical element. The method of manufacturing an article according to the embodiment includes a step of measuring the shape of an object using the above-described measuring apparatus, and a step of processing the object based on the measuring result in the preceding step. For example, the shape of an object is measured using the measuring apparatus, and the object is processed (manufactured) based on the measuring result so that the shape of the object matches the design value. The method of manufacturing an article according to the embodiment can measure the shape of an object by the measuring apparatus at high accuracy, and thus is superior to a conventional method in at least one of the performance, quality, productivity, and production cost of the article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-050532 filed on Mar. 13, 2014, which is hereby incorporated by reference herein in its entirety.

What is claimed is:

1. A measuring apparatus for obtaining information about a shape of an object, comprising:
    an emitting unit configured to emit pattern light;
    a projection optical system configured to guide the pattern light emitted from the emitting unit to the object;
    a deflection unit arranged between the projection optical system that guides the pattern light and the object and configured to deflect the pattern light emitted from the projection optical system, the deflection unit comprising a diffraction grating arranged between the projection optical system that guides the pattern light and the object and configured to diffract the pattern light emitted from the projection optical system;
    an image sensing unit configured to capture an image of the object via the projection optical system that guides the pattern light and the deflection unit that deflects the pattern light; and
    a processing unit configured to obtain information about the shape of the object based on the image of the object captured by the image sensing unit.

2. The apparatus according to claim 1, wherein the deflection unit that deflects the pattern light irradiates the object with diffracted light beams of a plurality of orders generated by the diffraction grating.

3. The apparatus according to claim 1, further comprising a change unit configured to change a distance between the object and the diffraction grating,
    wherein the processing unit is configured to repeatedly cause the change unit to change the distance and the image sensing unit to capture the image of the object, thereby obtaining a plurality of images, obtaining phases of diffracted light beams incident on the image sensing unit based on the plurality of images, and obtaining the information about the shape of the object based on the obtained phases.

4. The apparatus according to claim 1, further comprising a change unit configured to change a relative position between the object and the diffraction grating, change a period of the pattern light projected to the object, or spatially change an intensity of the pattern light.

5. The apparatus according to claim 3, wherein the change unit comprises an actuator configured to drive the diffraction grating along a direction parallel to an optical axis of the projection optical system that guides the pattern light.

6. The apparatus according to claim 3, wherein the emitting unit comprises a light source and a conversion element configured to convert light emitted from the light source into the pattern light having a periodical arrangement of bright portions and dark portions, and
    the processing unit is configured to cause the change unit to change the distance and cause the conversion element to change the period of the arrangement in the pattern light while repeatedly causing the change unit to change the distance and the image sensing unit to capture the image of the object.

7. The apparatus according to claim 6, wherein the conversion element comprises at least one of a liquid crystal element and a digital mirror device.

8. The apparatus according to claim 3, further comprising a second change unit configured to change a tilt of the diffraction grating so as to change an incident angle of the pattern light with respect to the diffraction grating, and
    the processing unit is configured to cause the change unit to change the distance and cause the second change unit to change the tilt of the diffraction grating while repeatedly causing the change unit to change the distance and the image sensing unit to capture the image of the object.

9. The apparatus according to claim 1, wherein the diffraction grating is arranged to be tilted such that the pattern light is obliquely incident on the diffraction grating.

10. The apparatus according to claim 1, wherein the deflection unit comprises a polarization diffraction grating whose deflection direction changes depending on a polarization state of incident light, and a waveplate.

11. The apparatus according to claim 1, wherein a diffraction direction of the diffraction grating does not change depending on a polarization state of incident light.

12. A measuring apparatus obtaining information about a shape of an object, comprising:
    an emitting unit configured to emit pattern light;
    a projection optical system configured to guide the pattern light emitted from the emitting unit to the object;
    a deflection unit arranged between the projection optical system that guides the pattern light and the object and configured to deflect the pattern light emitted from the projection optical system, the deflection unit comprising a liquid crystal element capable of converting a polarization state of the pattern light emitted from the projection optical system, and a polarization diffraction grating arranged between the projection optical system that guides the pattern light and the object and whose deflection direction changes depending on the polarization state of the pattern light emitted from the liquid crystal element;
    an image sensing unit configured to capture an image of the object via the projection optical system that guides the pattern light and the deflection unit that deflects the pattern light; and a processing unit configured to obtain information about the shape of the object based on the image of the object captured by the image sensing unit, wherein the processing unit controls the liquid crystal element such that the pattern light is deflected inward from outside of the polarization diffraction grating and irradiates the object.

13. The apparatus according to claim 12, wherein the liquid crystal element converts light having the polarization state of linearly polarized light into light having the polarization state of circularly polarized light.

14. A method of manufacturing an article, the method comprising steps of:

obtaining information about a shape of an object using a measuring apparatus; and processing the object based on a measuring result in the measuring, wherein the article is obtained from the processed object, and wherein the measuring apparatus measures the shape of the object, and includes:

an emitting unit configured to emit pattern light;

a projection optical system configured to guide the pattern light emitted from the emitting unit to the object;

a deflection unit arranged between the projection optical system that guides the pattern light and the object and configured to deflect the pattern light emitted from the projection optical system, the deflection unit comprising a diffraction grating arranged between the projection optical system that guides the pattern light and the object and configured to diffract the pattern light emitted from the projection optical system;

an image sensing unit configured to capture an image of the object via the projection optical system that guides the pattern light and the deflection unit that deflects the pattern light; and a processing unit configured to obtain information about the shape of the object based on the image of the object captured by the image sensing unit.

15. The apparatus according to claim 1, wherein the pattern light has a periodical arrangement of bright portions and dark portions.

16. The apparatus according to claim 1, wherein the projection optical system includes a beam splitter configured to guide the pattern light emitted from the emitting unit to the object, and the image sensing unit is configured to capture the image of the object via the beam splitter.

17. The apparatus according to claim 16, wherein the projection optical system includes two lenses arranged between the beam splitter and the object, and an aperture stop at a focal position between the two lenses.

18. A method of manufacturing an article, the method comprising steps of:

obtaining information about a shape of an object using a measuring apparatus; and processing the object based on a measuring result in the measuring, wherein the article is obtained from the processed object, and wherein the measuring apparatus measures the shape of the object, and includes:

an emitting unit configured to emit pattern light;

a projection optical system configured to guide the pattern light emitted from the emitting unit to the object;

a deflection unit arranged between the projection optical system that guides the pattern light and the object and configured to deflect the pattern light emitted from the projection optical system, the deflection unit comprising a liquid crystal element capable of converting a polarization state of the pattern light emitted from the projection optical system, and a polarization diffraction grating arranged between the projection optical system that guides the pattern light and the object and whose deflection direction changes depending on the polarization state of the pattern light emitted from the liquid crystal element;

an image sensing unit configured to capture an image of the object via the projection optical system that guides the pattern light and the deflection unit that deflects the pattern light; and a processing unit configured to obtain information about the shape of the object based on the image of the object captured by the image sensing unit, wherein the processing unit controls the liquid crystal element such that the pattern light is deflected inward from outside of the polarization diffraction grating and irradiates the object.

* * * * *